(12) United States Patent
Tomokawa et al.

(10) Patent No.: US 11,942,056 B2
(45) Date of Patent: Mar. 26, 2024

(54) DISPLAY DEVICE AND METHOD OF PRODUCING THE SAME

(71) Applicant: Sharp Display Technology Corporation, Kameyama (JP)

(72) Inventors: Shinji Tomokawa, Kameyama (JP); Yasutomo Nishihara, Kameyama (JP); Yohji Inui, Kameyama (JP); Kohichi Ohhara, Kameyama (JP); Katsutoshi Kikuchi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/893,631

(22) Filed: Aug. 23, 2022

(65) Prior Publication Data

US 2023/0096847 A1 Mar. 30, 2023

(30) Foreign Application Priority Data

Sep. 24, 2021 (JP) ................................ 2021-155789

(51) Int. Cl.
*G09G 3/36* (2006.01)
*G02F 1/13357* (2006.01)
*G09G 3/34* (2006.01)

(52) U.S. Cl.
CPC .......... *G09G 3/3648* (2013.01); *G02F 1/1336* (2013.01); *G09G 3/3406* (2013.01); *G09G 2320/0233* (2013.01); *G09G 2360/16* (2013.01)

(58) Field of Classification Search
CPC ............................. G06F 3/3648; G02F 1/1336

USPC ........ 345/440; 348/E5.079; 349/169; 73/273
See application file for complete search history.

(56) References Cited

U.S. PATENT DOCUMENTS

| | | | | |
|---|---|---|---|---|
| 2008/0170248 | A1* | 7/2008 | Kang ................... | H04N 25/611 348/E5.079 |
| 2010/0007819 | A1* | 1/2010 | Kumasaka ........... | G02B 6/0078 349/61 |
| 2015/0160060 | A1* | 6/2015 | Christie .................. | G01F 15/14 73/273 |
| 2015/0348267 | A1* | 12/2015 | Hayashi .................... | G06T 3/00 382/294 |
| 2018/0321556 | A1* | 11/2018 | Watanabe ......... | G02F 1/133603 |

FOREIGN PATENT DOCUMENTS

JP 2010-107881 A 5/2010

* cited by examiner

*Primary Examiner* — Prabodh M Dharia
(74) *Attorney, Agent, or Firm* — ScienBiziP, P.C.

(57) ABSTRACT

A display device includes a lighting device, a display panel, a memory, and a correction circuit. The lighting device includes a light exit area defined into light exit sections corresponding to light sources. The display panel includes a display area disposed opposite the light exit area and including pixels. The memory stores data of pixel matrix linked to the display sections. The memory stores position data of the pixels that are not disposed opposite the corresponding light exit sections and deviation data when a position error is caused between the light exit area and the display area. The correction circuit is configured to determine whether the memory stores the position data of the pixels and link new pixel matrix units to the corresponding display sections based on the deviation data if a determination result is affirmative.

13 Claims, 24 Drawing Sheets

DISPLAY DEVICE AND METHOD OF PRODUCING THE SAME

CROSS-REFERENCE TO RELATED APPLICATION

This application claims priority from Japanese patent application No. 2021-155789 filed on Sep. 24, 2021. The entire contents of the priority application are incorporated herein by reference.

TECHNICAL FIELD

The technology described herein relates to a display device and a method of producing the display device.

BACKGROUND

In a process of producing liquid crystal display devices, positions of a liquid crystal panel and a backlight may not match each other when the liquid crystal panel is mounted on the backlight. If such a position error is caused, pixel values may be corrected corresponding to an error value related to the position error. An example of methods of correcting pixel values may include an error value detecting process, a light emission amount calculating process, and a correcting process. In the error value detecting process, the error value is detected according to a user operation. In the light emission amount calculating process, a light source corresponding to each pixel is specified based on the error value detected by the error value detecting process and the light emission amount required for the specified light source is calculated based on the pixel value of the corresponding pixel. In the correcting process, the pixel position of each pixel is specified based on the error value detected by the error value detecting process and the pixel value of each pixel is corrected so as to compensate excess and shortage of the light amount caused by the optical distribution of the light sources.

Image unevenness that may be caused due to the mounting error in mounting the liquid crystal panel on the backlight may be less likely to be caused with the above method. However, the relative position between the light sources and sub-display sections is not corrected with the above method. The sub-display sections are obtained by dividing the display area into multiple sections. The excess and shortage of the amount of light rays are compensated by correcting the pixel values; however, the excess and shortage of the amount of light rays that are supplied from the light sources to the sub-display sections are not compensated. Although the excess and shortage of the amount of light rays can be compensated by correcting the pixel values, the correction of the pixel values may change the display gradation of the pixels from the designed display gradation. The display quality may not be improved effectively.

SUMMARY

The technology described herein was made in view of the above circumstances. An object is to improve display quality even with a display panel and a lighting device being arranged with a physical position error.

A display device according to the technology described herein includes a lighting device, a display panel, a memory, and a correction circuit. The lighting device includes light sources and a light exit area from which light emitted by the light sources exits. The light exit area includes light exit sections that are defined corresponding to the light sources. The display panel is mounted on the lighting device. The display panel includes a display area that is opposed to the light exit area and displays an image and a non-display area that is disposed around the display area. The display panel includes pixels arranged in a matrix in the display area. The display area includes display sections that are defined to be opposed to the light exit sections, respectively. The memory stores default pixel matrix data including plurality of position data of default pixel matrix units including the pixels that are linked to the display sections with respect to design. The memory stores non-opposed pixel data and deviation data when a position error is caused between the light exit area and the display area. The non-opposed pixel data includes position data of some of the pixels that are not opposed to the light exit area when the position error is caused. The deviation data includes data representing a deviation direction and a deviation amount that are related to a deviation between positions of the default pixel matrix units that are included in the default pixel matrix data and positions of opposed pixel matrix units that are opposed to corresponding light exit sections when the position error is caused and. The correction circuit is connected to the memory and configured to determine whether the memory stores the non-opposed pixel data. If determining that the memory stores the non-opposed pixel data, the correction circuit is configured to link the opposed pixel matrix units of the pixels that are off from the default pixel matrix units included in the default pixel matrix data by the deviation amount in the deviation direction represented by the deviation data to corresponding display sections, respectively, and create new pixel matrix data related to the opposed pixel matrix units in the corresponding display sections and store the new pixel matrix data in the memory.

According to the technology described herein, display quality can be improved even with a display panel and a lighting device being arranged with a physical position error.

DETAILED DESCRIPTION

First Embodiment

Figure 3:
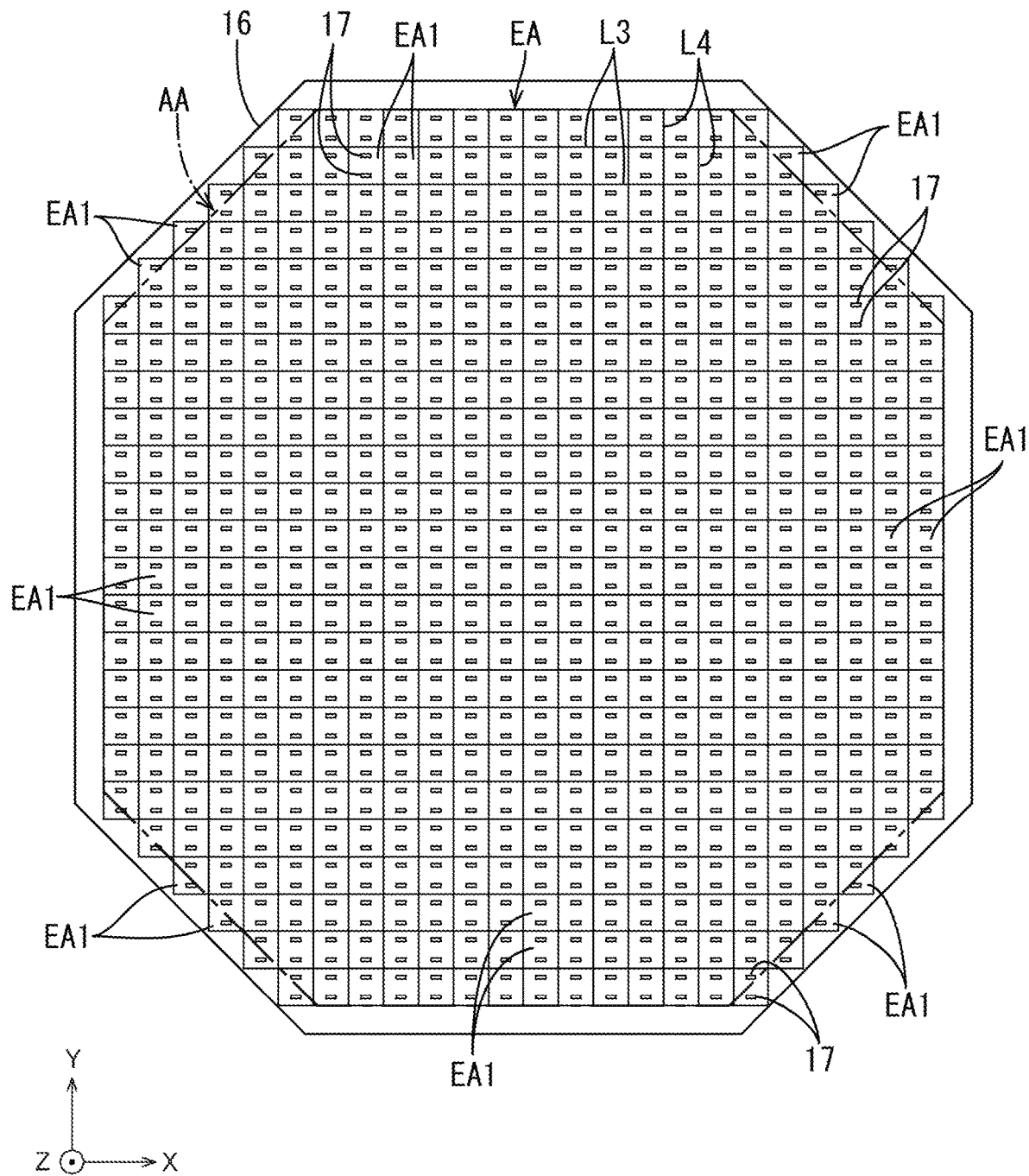
FIG. 3 is a plan view of a backlight included in the liquid crystal display device.
Figure 4:
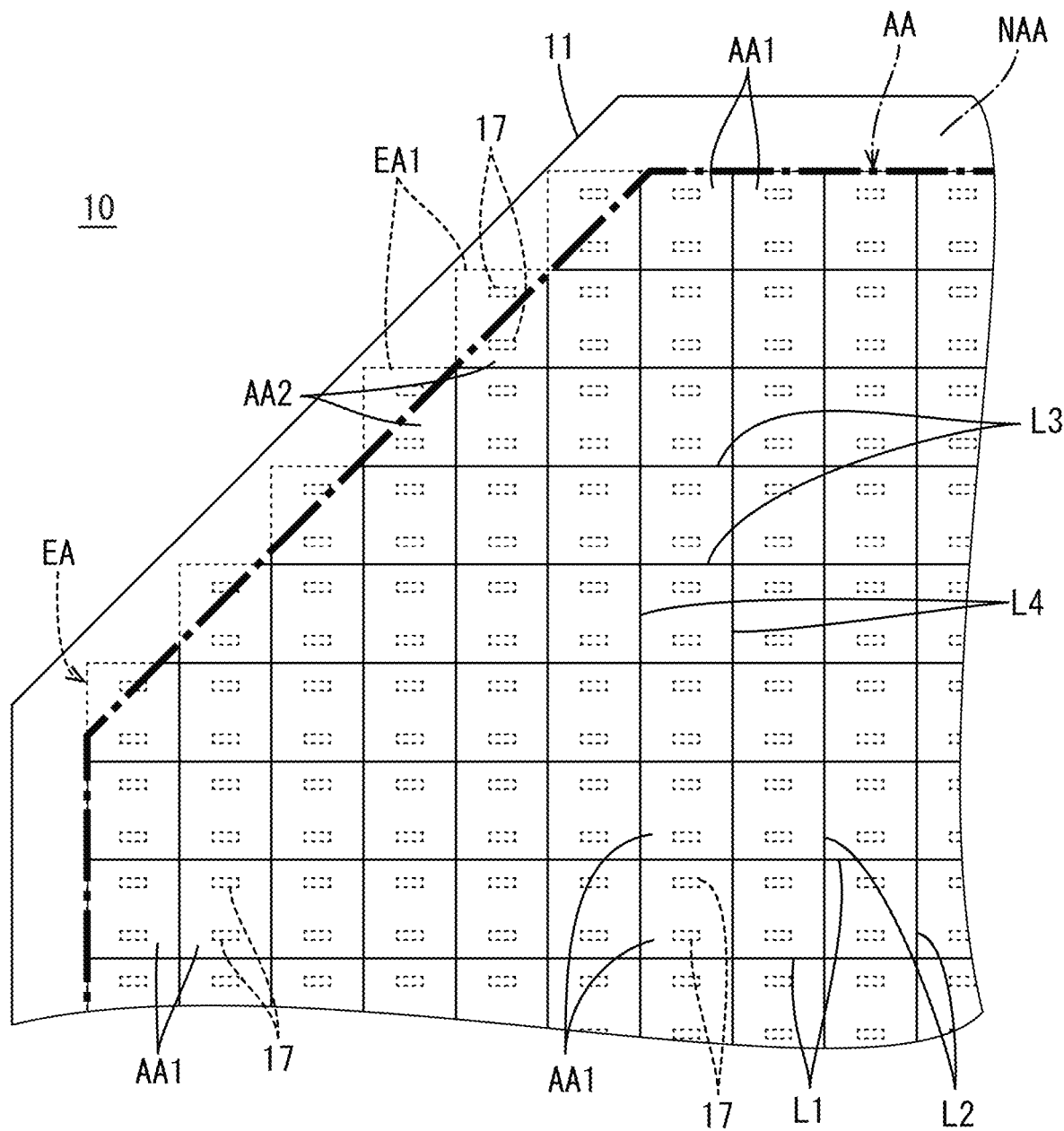
FIG. 4 is a magnified plan view of a portion of the liquid crystal panel.
Figure 5:
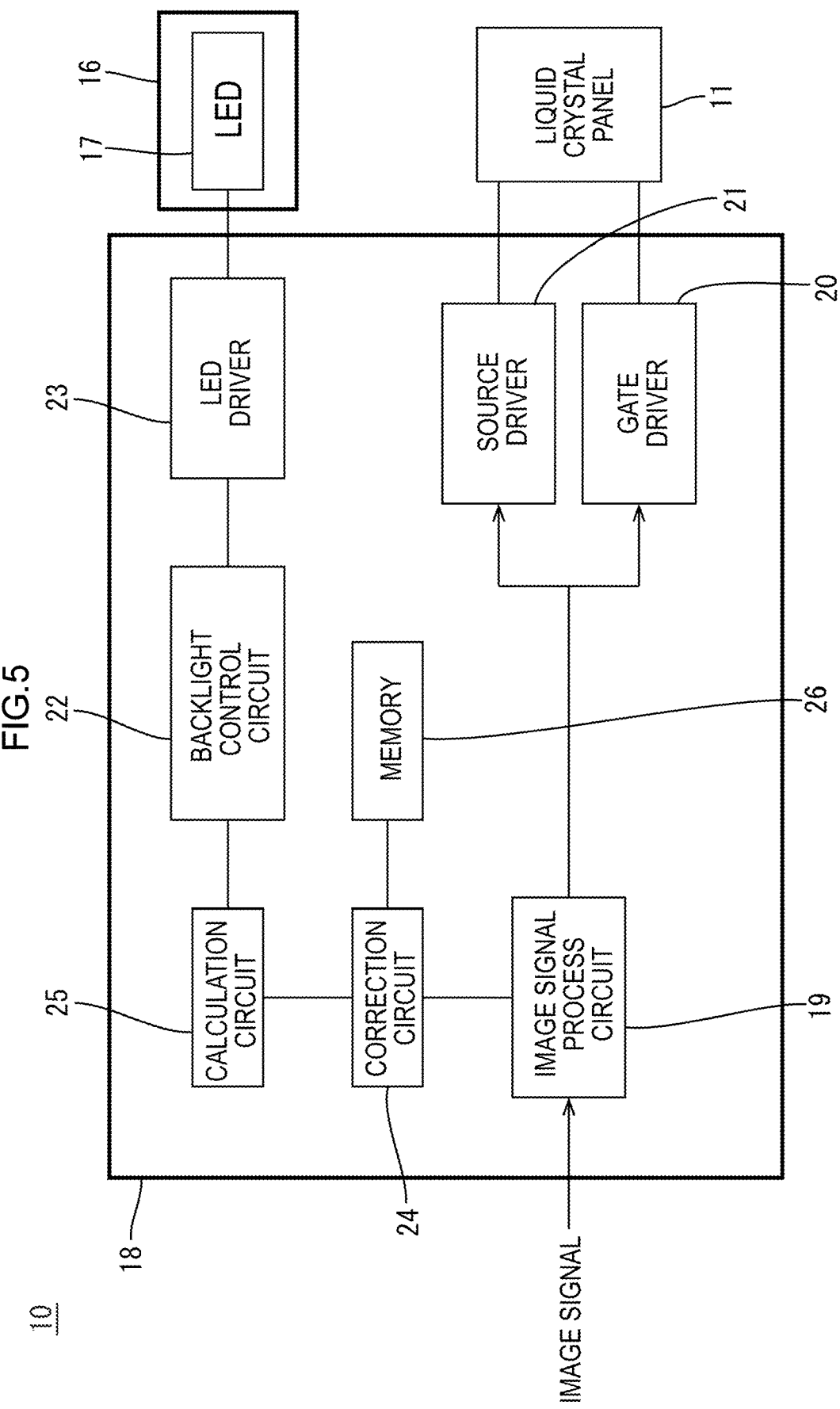
FIG. 5 is a block diagram illustrating an electric configuration of the liquid crystal display device.

A liquid crystal display device 10 and a method of producing the liquid crystal display device 10 will be described with reference to FIGS. 1 to 9. As illustrated in FIG. 5, the liquid crystal display device 10 includes a liquid crystal panel 11 (a display panel), a backlight 16 (a lighting device), and a control circuit 18. The liquid crystal display device 10 is used for a head mount display, for instance.

Figure 1:
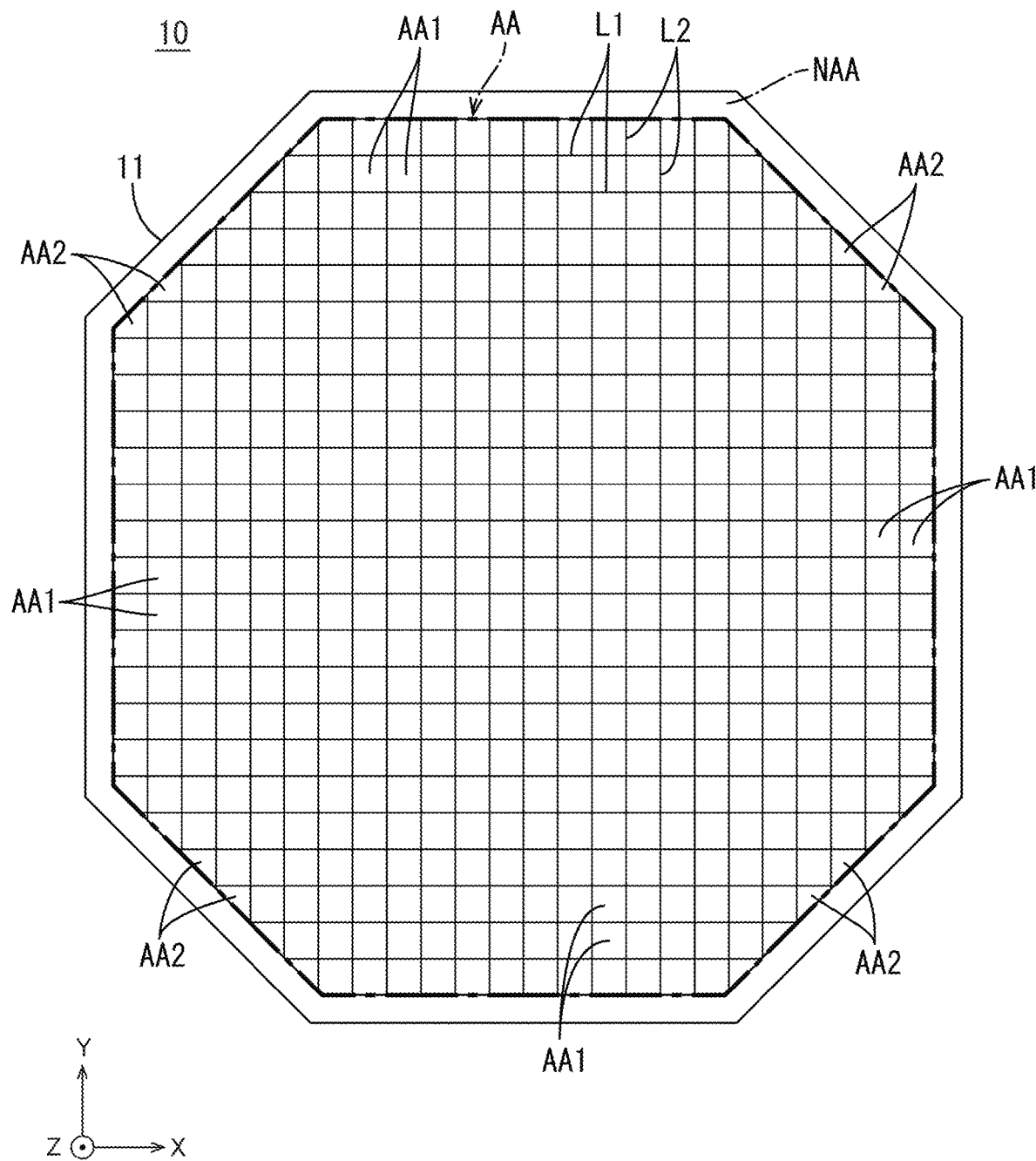
FIG. 1 is a plan view of a liquid crystal display panel in a liquid crystal display device according to a first embodiment.

As illustrated in FIG. 1, the liquid display panel 11 has a vertically long octagonal shape in a plan view. The liquid crystal panel 11 includes a display area AA and a non-display area NAA. The display area AA is in a middle section of the liquid crystal panel 11 and images are displayed on the display area AA. The non-display area NAA corresponds to an outer area of the plate surface of the liquid crystal panel 11 surrounding the display area AA and no image is displayed on the non-display area NAA. An outline of the display area AA is indicated by a dash-dot line in FIG. 1. The outline of the display area AA follows the outline of the liquid crystal panel 11 and has a vertically long octagonal shape in a plan view. The non-display area NAA has a vertically long octagonal frame shape in a plan view with extending along the outline of the display area AA. When the liquid crystal display device 10 is used for a head mount display, a resolution of the display area AA of the liquid crystal panel 11 is preferably 1000 ppi (pixel per inch) or higher; however, the resolution is not limited to 1000 ppi.

The display area AA is defined into first display sections AA1 and second display sections AA2 with respect to the X-axis direction and the Y-axis direction. More in detail, the display area AA is divided into sections with respect to the X-axis direction and the Y-axis direction. The sections are arranged in rows and columns such that a longest row extending in the X-axis direction includes twenty four first display sections AA1 and a longest column extending in the Y-axis direction includes twenty four first display sections AA1. In FIG. 1, the sections defined by lines L1 extending in the X-axis direction and lines L2 extending in the Y-axis direction are the first display sections AA1. Each of the sections defined by the lines L1, the lines L2, and edges that are inclined with respect to the X-axis direction and the Y-axis direction is the second display section AA2. Each of the second display sections AA2 is defined by the line L1, the line L2, and the inclined edge.

Each of the first display sections AA1 has a vertical long rectangular shape. Each of the second display sections AA2 has a shape having an inclined side with respect to the lines L1, L2. All the first display sections AA1 have a same area but not all the second display sections AA2 have a same area and some of the second display sections AA2 have different shapes and different areas.

The liquid crystal panel 11 includes an opposed substrate and an array substrate (an active matrix substrate, an element substrate). The array substrate is disposed on a back side of the opposed substrate and bonded to the opposed substrate. Each of the opposed substrate and the array substrate includes a glass substrate and various kinds of films are disposed on inner surfaces of the glass substrates. Polarizing plates are attached to outer surfaces of the opposed substrate and the array substrate.

Figure 2:
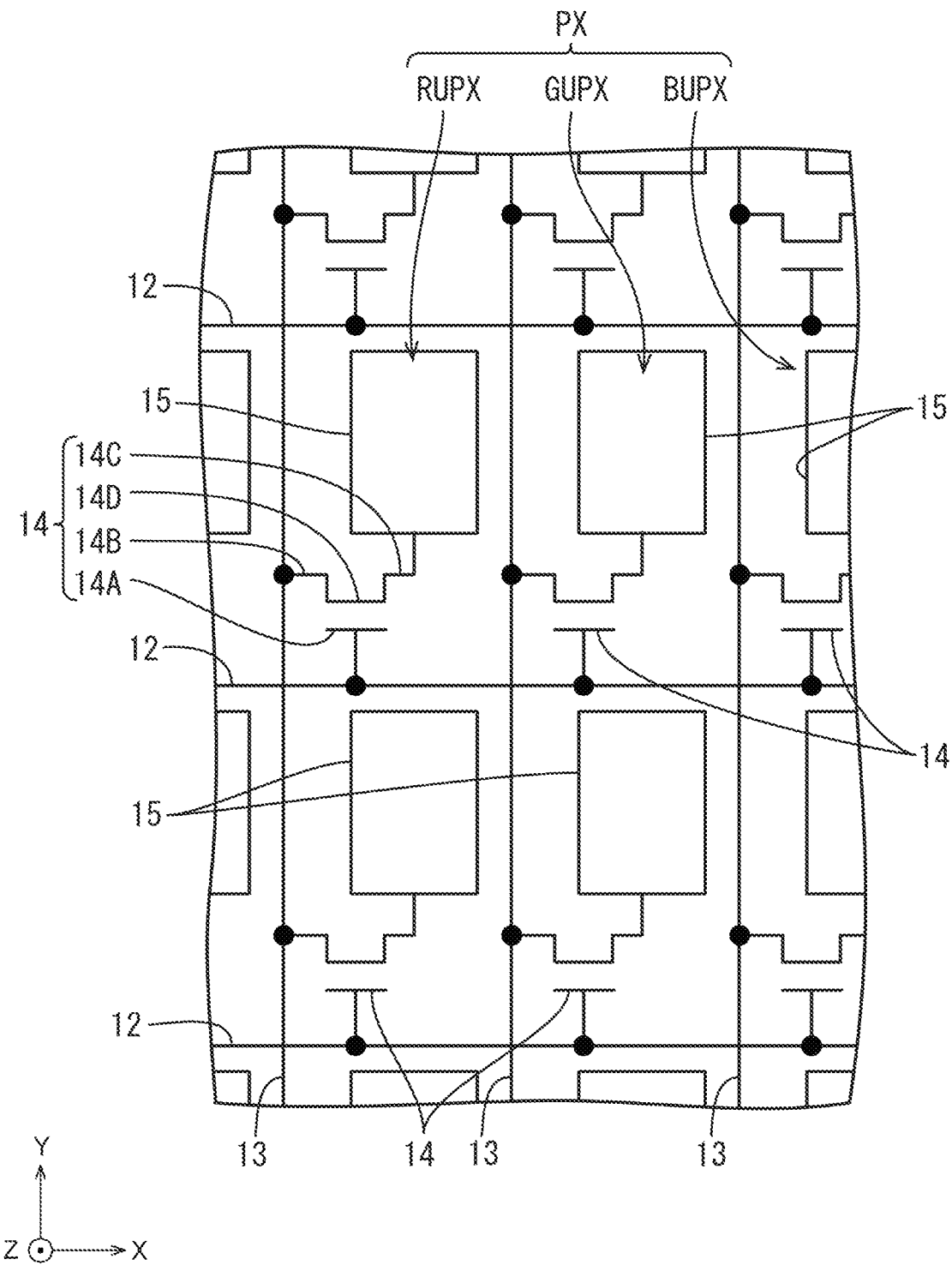
FIG. 2 is a circuit diagram illustrating arrangement of pixels of the liquid crystal panel.

As illustrated in FIG. 2, the array substrate includes gate lines 12 (scan lines) and source lines 13 (image lines) that are arranged in a matrix on the glass substrate. TFTs 14 (switching components) and pixel electrodes 15 are arranged near intersections of the gate lines 12 and the source lines 13. The gate lines 12 extend in the X-axis direction to cross the display area AA. Each of the gate lines 12 is connected to a gate electrode 14A of a corresponding one of the TFTs 14. The gate lines 12 are arranged at intervals in the Y-axis direction. Scan signals are transferred via the gate lines 12. The source lines 13 extend in the Y-axis direction to cross the display area AA. Each of the source lines 13 is connected to a source electrode 14B of a corresponding one of the TFTs 14. The source lines 13 are arranged at intervals in the X-axis direction. Image signals (data signals) are transferred via the source lines 13.

A row of the TFTs 14 and the pixel electrodes 15 extends in the X-axis direction and includes the TFTs 14 and the pixel electrodes 15 that are arranged regularly. A column of the TFTs 14 and the pixel electrodes 15 extends in the Y-axis direction and includes the TFTs 14 and the pixel electrodes 15 that are arranged regularly. The TFTs 14 and the pixel electrodes 15 are arranged in rows and columns as a whole. A drain electrode 14C of each of the TFTs 14 is connected to a corresponding one of the pixel electrodes 15. The TFTs 14 include channel sections 14D made of oxide semiconductor films. The channel sections 14D are connected to the source electrodes 14B and the drain electrodes 14C, respectively. Upon driving of the TFTs 14 based on the scan signals transferred via the gate lines 12, the image signals transferred via the source lines 13 are supplied to the drain electrodes 14C via the channel sections 13D. As a result, each of the pixel electrodes 15 is charged at a potential based on the corresponding image signal.

The opposed substrate includes color filters and a light blocking portion (a black matrix) on an inner surface of the opposed surface in the display area AA. The color filters include red (R), green (G), and blue (B) color filters. The color filters are opposed to the respective pixel electrodes 15. The light blocking portion is disposed among the color filters to separate the adjacent color filters. Each of the red color filters and a corresponding one of the pixel electrodes 15 are configured as a red unit pixel RUPX. Each of the green color filters and a corresponding one of the pixel electrodes 15 are configured as a green unit pixel GUPX. Each of the blue color filters and a corresponding one of the pixel electrodes 15 are configured as a blue unit pixel RUPX. The red unit pixel RUPX, the green unit pixel GUPX, and the blue unit pixel RUPX that are adjacent to one another are configured as one pixel PX.

The pixels PX are arranged in rows and columns in the display area AA. Each of the pixels PX exerts color displaying with a certain gradation. The pixels PX have a substantially same X-axis dimension and a substantially same Y-axis dimension. When the liquid crystal display device 10 is used for a head mount display, the X-axis dimension and the Y-axis dimension of the pixels PX are preferably 24 µm or less; however, the dimension is not limited to the specific value.

The backlight 16 is disposed behind the liquid crystal panel 11. As illustrated in FIG. 3, the backlight 16 has a vertically long octagonal shape in a plan view. A front surface of the backlight 16 is opposed to a back surface of the liquid crystal panel 11 and the front surface of the backlight 16 is a light exit surface. Light exits the backlight 16 through the light exit surface toward the liquid crystal panel 11. The light exit surface of the backlight 16 includes a light exit area EA in a middle portion of the light exit surface. Light effectively exits through the light exit area EA toward the display area AA of the liquid crystal panel 11. The light exit area EA and the display area AA are opposed to each other. LEDs 17 are arranged in the light exit area EA. The light exit area EA is a LED arrangement area (light source arrangement area) in which the LEDs 17 are arranged. The backlight 16 further includes a LED board on which the LEDs 17 are mounted, optical members, a reflective sheet, and a chassis, in addition to the LEDs 17.

The light exit area EA has a vertically long octagonal shape in a plan view so as to follow the outline of the display area AA. The light exit area EA is equally defined into light exit sections EA1 with respect to the X-axis direction and the Y-axis direction. The light exit sections EA1 are arranged in rows and columns such that a longest row extending in the X-axis direction includes twenty four light exit sections EA1 and a longest column extending in the Y-axis direction includes twenty four light exit sections EA1. In FIG. 4, the sections defined by lines L3 extending in the X-axis direction and lines L4 extending in the Y-axis direction are the light exit sections EA1. Each of the light exit sections EA1 has a vertically long rectangular plan view shape.

The light exit sections EA1 have a same area. Two LEDs 17 are arranged in each light exit section EA1 so as to be away from each other in the Y-axis direction. Light emitted by the two LEDs 17 exits outside through each light exit section EA1. A total number of the LEDs 17 disposed in all the light exit sections EA1 is twice as a total number of the light exit sections EA1.

As illustrated in FIG. 4, the first display sections AA1 and the corresponding light exit sections EA1 are opposed to each other, respectively, with an entire area of each first display section AA1 and an entire area of each light exit section EA1. Each of the second display sections AA2 is opposed to a portion of the corresponding light exit section EA1. A portion of the light exit section EA1 that is not opposed to the corresponding second display section AA2 is opposed to the non-display area NAA. Design display sections of the first display sections AA1 are referred to as first default display sections AAD1 and design display sections of the second display sections AA2 are referred to as second default display sections AAD2.

Figure 6:
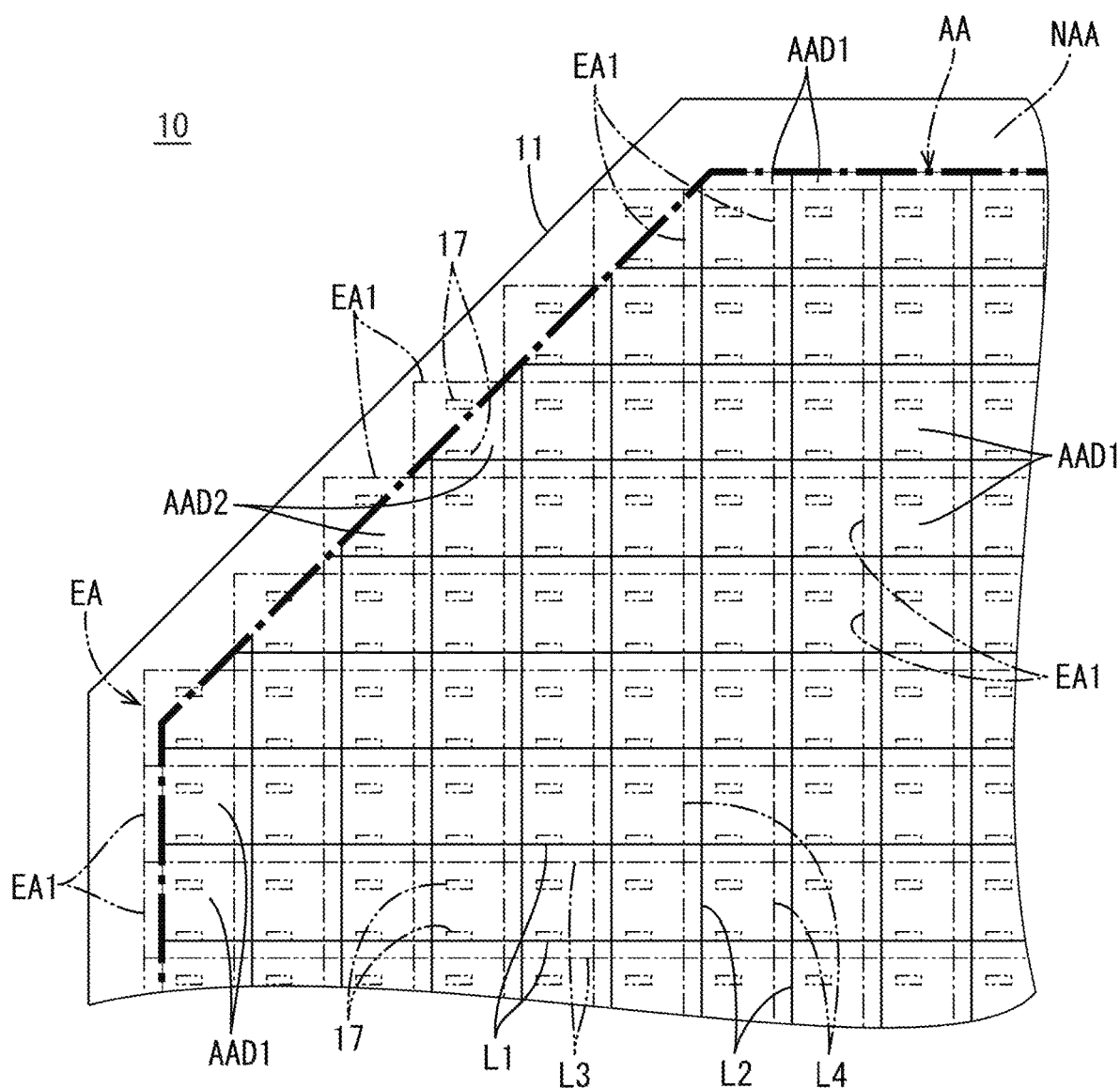
FIG. 6 is a plan view illustrating a portion of the liquid crystal display device including the liquid crystal panel and the backlight that are arranged with a position error.
Figure 7:
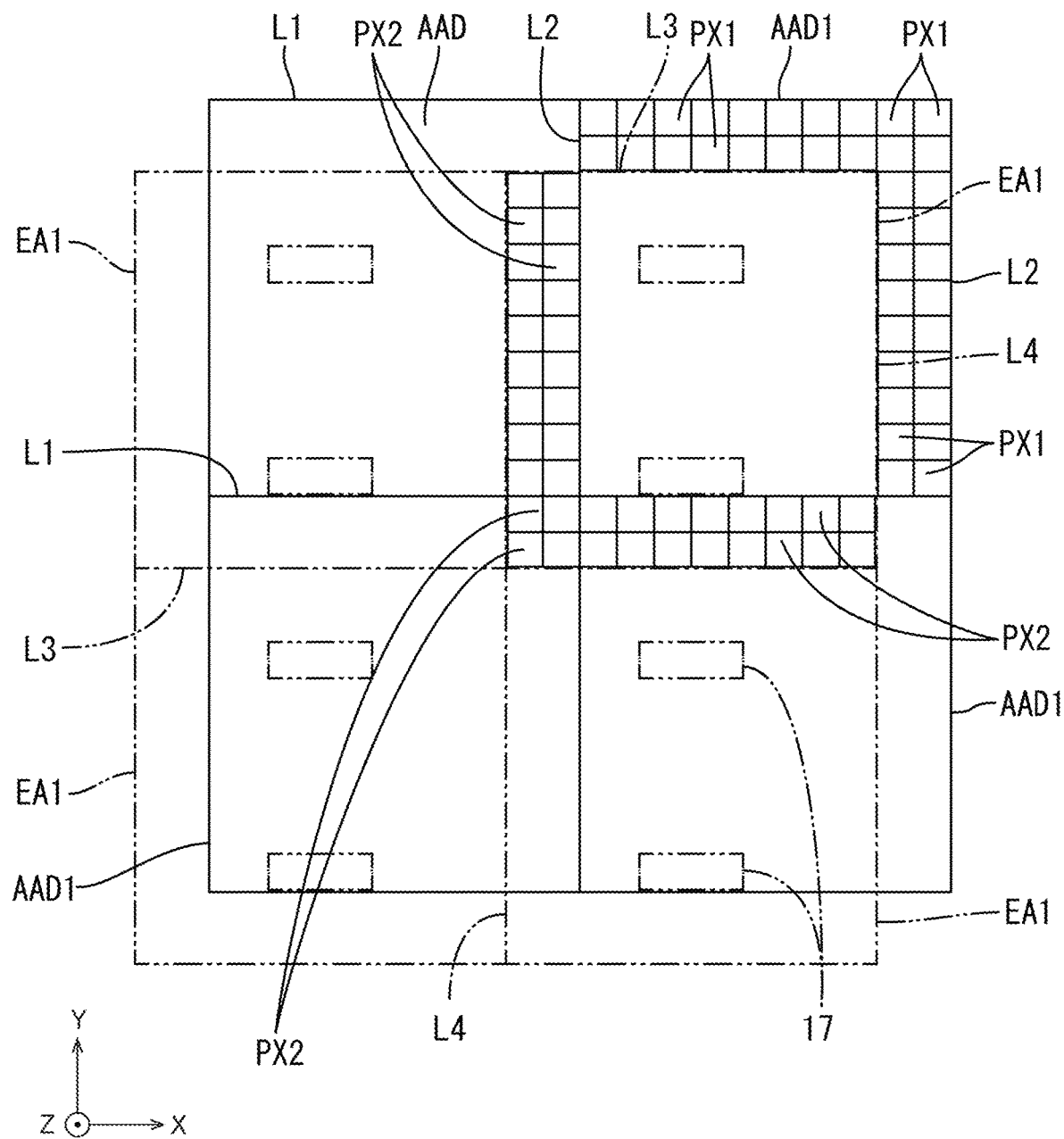
FIG. 7 is a magnified plan view of a portion of FIG. 6.
Figure 8:
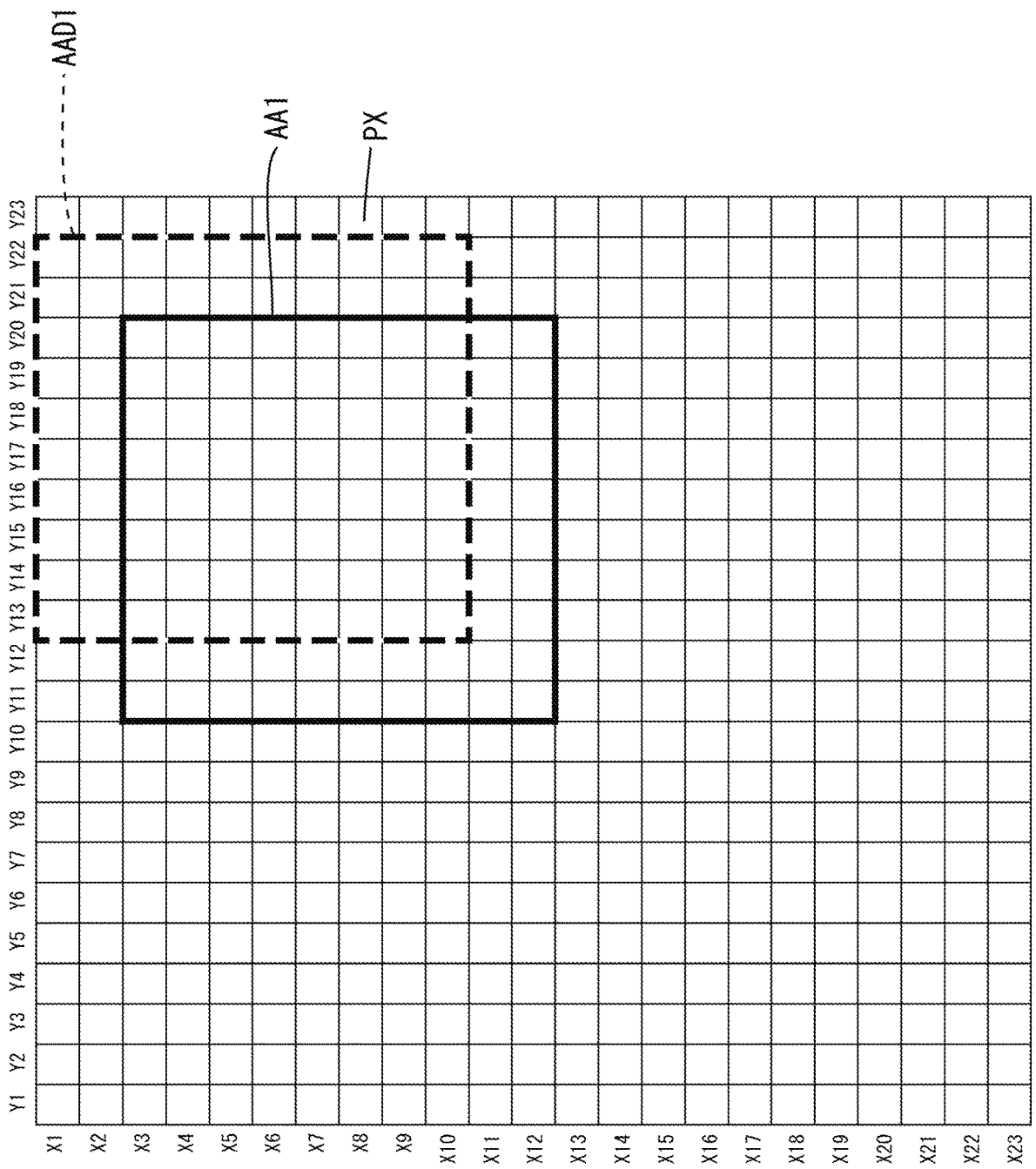
FIG. 8 is a general view illustrating pixel matrix, a default display section, and a display section.

In FIGS. 6 and 7, the first default display sections AAD1 and the second default display sections AAD2 are illustrated with solid lines. The light exit sections EA1 and the LEDs 17 are illustrated with dash-dot-dot-dash lines. Among the pixels PX disposed in the upper right first default display section AAD1 in FIG. 7, the pixels PX that are not opposed to the upper right light exit section EA1 are defined as first pixels PX1 and schematically illustrated. Among the pixels PX that are not included in the upper right first default display section AAD1 in FIG. 7, the pixels PX that overlap the upper right light exit section EA1 are defined as second pixels PX2 and schematically illustrated. In FIG. 8, the first default display section AAD1 is illustrated with a dot line and the first display section AA1 is illustrated with a solid line.

The control circuit 18 is a single chip. As illustrated in FIG. 5, the control circuit 18 includes an image signal process circuit 19, a gate driver 20 (a display driver), a source driver 21 (the display driver), a backlight control circuit 22 (a lighting device control circuit), a LED driver 23 (a light source driver), a correction circuit 24, a calculation circuit 25, and a memory 26. The correction circuit 24 is connected to the image signal process circuit 19, the calculation circuit 25, and the memory 26. The backlight control circuit 22 is connected to the calculation circuit 25. The LED driver 23 is connected to the backlight control circuit 22 and the LEDs 17. The gate driver 20 and the source driver 21 are connected to the image signal process circuit 19 and the liquid crystal panel 11.

Upon receiving an image signal from a host system, the image signal process circuit 19 is configured to process the image signal and input the processed image signal to the gate driver 20 and the source driver 21 and to the backlight control circuit 22 via the correction circuit 24 and the calculation circuit 25. The gate driver 20 is configured to input a scan signal based on the signal from the image signal process circuit 19 to the gate electrode 14A through the gate line 12. The source driver 21 is configured to input an image signal based on the signal from the image signal process circuit 19 to the source electrode 14B through the source line 13. In response to the input of the scan signal to the gate electrode 14A, the TFT 14 is driven and the image signal inputted to the source electrode 14B is transferred to the drain electrode 14C via the channel section 14D and the pixel electrode 15, which is connected to the drain electrode 14C, is charged at a potential based on the image signal.

The image signal processed with the image signal process circuit 19 includes data that represents luminance necessary for display in the first display section AA1 and the second display section AA2. The backlight control circuit 22 is configured to control the light emission amount of each of the LEDs 17 disposed in each light exit section EA1 based on the data. The light exit amount of light rays that exit through each of the light exit sections EA1 corresponding to the first display sections AA1 and the second display sections AA2 can be controlled. The amount of light rays that are supplied to each of the first display sections AA1 and the amount of light rays that are supplied to each of the second display sections AA2 can be controlled. Thus, the local dimming control can be performed and high contrast performance can be obtained.

The LED driver 23 is configured to turn on or off each of the LEDs 17 based on the control signal from the backlight control circuit 22. The LED driver 23 is configured to control the LEDs 17 with the pulse width modulation (PWM) driving method and control the light emission amount of each LED 17 appropriately. With the PWM driving method, the LEDs 17 periodically blink and a time ratio of the ON time and the OFF time is changed.

Dimension errors may be caused in the components of the liquid crystal display device 10 (particularly, the components of the backlight 16) during the producing process. Assembly errors may be caused during the producing process of the liquid crystal display device 10. Particularly, assembly errors may be caused when the liquid crystal panel 11 and the backlight 16 are joined together. Due to such errors, a position error may be caused between the first default display sections AAD1 of the liquid crystal panel 11 and the corresponding light exit sections EA1 of the backlight 16 and between the second default display sections AAD2 and the corresponding light exit sections EA1. In such a position error is caused, a sufficient amount of light is not supplied to the first default display sections AAD1 and the second default display sections AAD2 and the contrast performance may be lowered.

The liquid crystal display device 10 performs the correcting process according to the position error. In the correcting process, the first default display section AAD1 is corrected and the first display section AA1 that is opposed to the light exit section EA1 is determined and the second default display section AAD2 is corrected and the second display section AA2 that is opposed to the light exit section EA1 is determined. Details of the correcting process will be described below.

The memory 26 stores position data of the pixels PX, data representing matrix data of the pixels PX that are linked to each of the first default display sections AAD1 (hereinafter, referred to as first default pixel matrix data), and data representing matrix data of the pixels PX that are linked to each of the second default display sections AAD2 (hereinafter, referred to as second default pixel matrix data). When a position error is caused between the liquid crystal panel 11 and the backlight 16, the memory 26 stores position data of the pixels PX that are not opposed to the light exit sections EA1 (hereinafter, referred to as non-opposed pixel data). The non-opposed pixel data includes X-coordinates and Y-coordinates of the pixels PX. The memory 26 further stores data representing a deviation direction and a deviation amount with which the first default display sections AAD1 and the second default display sections AAD2 are off from the corresponding light exit sections EA1 (hereinafter, referred to as deviation data).

Figure 9:
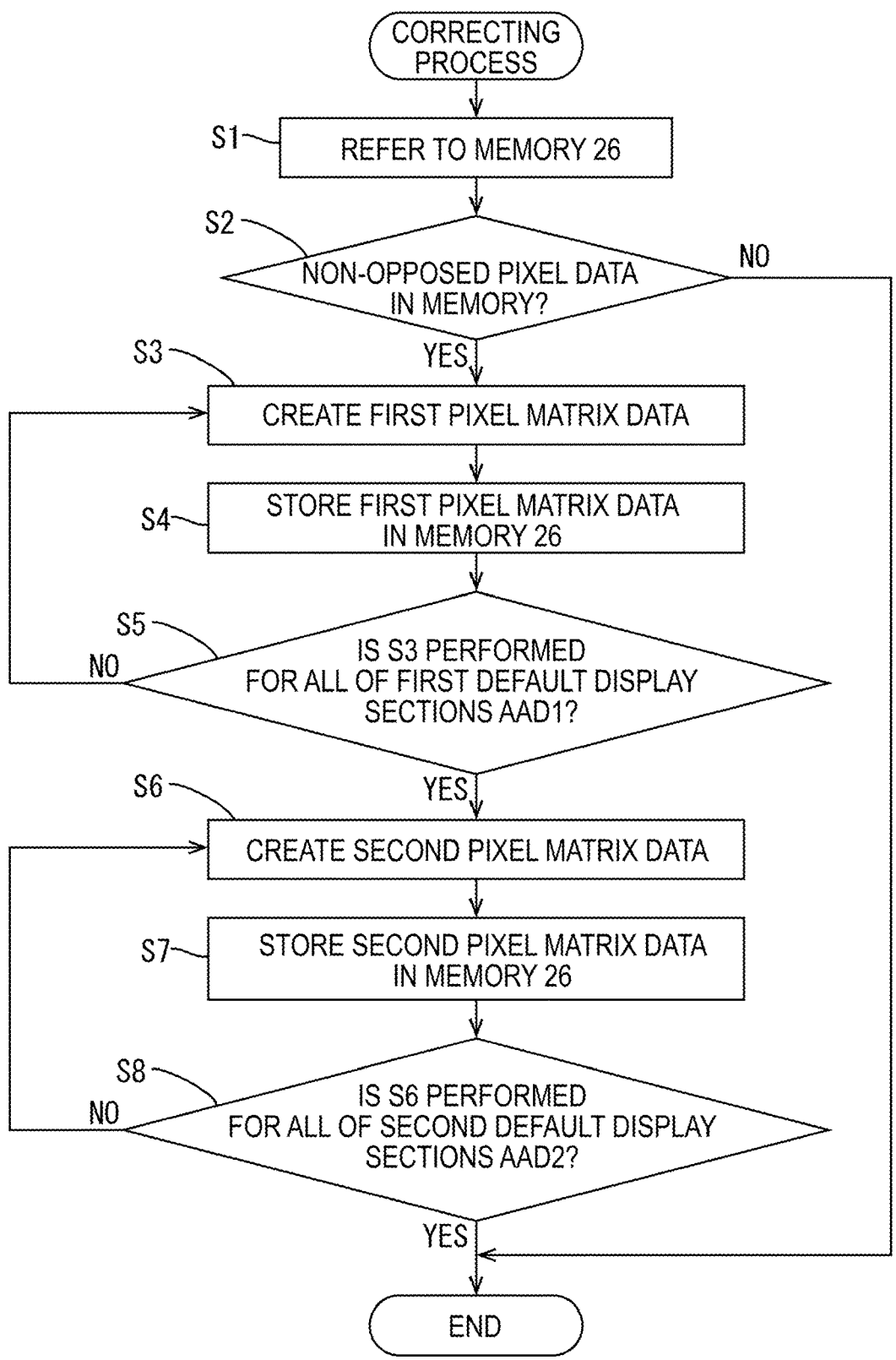
FIG. 9 is a flowchart of a correcting process.

A predefined inspection is performed for the liquid crystal panel 11 and the backlight 16 and the non-opposed pixel data and the deviation data are created based on results of the predefined inspection. Specifically, it is determined whether there is any pixel PX that is not opposed to the corresponding light exit section EA1 among the pixels PX that are included in the first default display sections AAD1 and the second default display sections AAD2. If the determination result is yes, the non-opposed pixel data is created and stored in the memory 26. Subsequently, the deviation direction and the deviation amount are determined based on the non-opposed pixel data. Based on the determination result, the deviation data representing the deviation direction and the deviation amount is created and stored in the memory 26. Based on the deviation data, the correcting process illustrated in FIG. 9 is performed.

For example, the position error illustrated in FIGS. 6 and 7 is detected. Namely, the first default display section AAD1 and the second default display section AAD2 are off from the corresponding light exit sections EA1 by two columns of the pixels PX in a +X-axis direction and two rows of the pixels X in a +Y-axis direction.

The correction circuit 24 refers to the memory 26 (S1) and determines whether the non-opposed pixel data is in the memory 26 (S2). If no position error is caused, the memory 26 does not store the non-opposed pixel data (S2:NO). The correction circuit 24 terminates the correcting process without performing any correction.

If the memory 26 stores the non-opposed pixel data (S2:YES), the non-opposed pixel data is stored in the memory 26. The non-opposed pixel data represents that the two columns of the pixels PX and the two rows of the pixels PX among the pixel matrix linked to each of the first default display sections AAD1 and the second default display sections AAD2 are not opposed to the light exit sections EA1. The memory 26 also stores the deviation data representing that the first default display sections AAD1 are off from the corresponding light exit sections EA1 by two columns of the pixels PX in the +X-axis direction and two rows of the pixels PX in the +Y-axis direction.

Therefore, the correction circuit 24 corrects the first default display sections AAD1 and the second default display sections AAD2 based on the deviation data and defines the first display sections AA1 and the second display sections AA2. Namely, the correction circuit 24 performs the correction process for the first default display sections AAD1 and the second default display sections AAD2 and defines the first display sections AA1 and the second display sections AA2 at the positions that are off from the corresponding first default display sections AAD1 and the corresponding second default display sections AAD2 by two columns of the pixels PX in a −X-axis direction and two rows of the pixels PX in a −Y-axis direction.

Specifically, the correction circuit 24 selects a pixel matrix unit that is at a position being off from a pixel matrix unit (a default pixel matrix unit) included in the first default pixel matrix data by two columns of the pixels PX in the −X-axis direction and two rows of the pixels PX in the −Y-axis direction (S3). The correction circuit 24 links the pixels PX included in the selected pixel matrix unit to the first display section AA1 and creates the first pixel matrix data (S3). A pixel matrix unit includes a group of pixels PX that are arranged in rows and columns. The correction circuit 24 selects a pixel matrix unit that is at a position being off from a pixel matrix unit included in the second default pixel matrix data by two columns of the pixels PX in the −X-axis direction and two rows of the pixels PX in the −Y-axis direction (S6). The correction circuit 24 links the pixels PX included in the selected pixel matrix unit to the second display section AA2 and creates the second pixel matrix data (S6). The correction circuit 24 stores the first pixel matrix data and the second pixel matrix data in the memory 26 (S4, S7).

The process of creating the first pixel matrix data and the second pixel matrix data will be specifically described with reference to FIGS. 7 to 9. For simplifying the description, the process of changing the pixel matrix unit included in the right upper first default display section AAD1 in FIG. 7 to the pixel matrix unit included in the first display section AA1 will be described with reference to FIG. 8. FIG. 8 illustrates an example of one first default display section AAD1 and one first display section AA1. The example in FIG. 8 differs from the actual first default display section AAD1 and the actual first display section AA1 in the number of the pixels PX, the row numbers and the column numbers of the pixels PX. The row numbers (X1-X23) and the column numbers (Y1-Y23) are provided for the explanation.

The pixels PX in the rows X1-X10 and the columns Y12-Y22 are linked to the first default display section AAD1 (the first default pixel matrix data). Based on the deviation data, the correction circuit 24 links the pixel matrix unit (an opposed pixel matrix unit) including the pixels PX in the rows X3-X12 and the columns Y11-Y20 to the first display section AA1 that is opposed to the light exit section EA1 (S3) and creates data of the first display section AA1 (new pixel matrix data, the first pixel matrix data) and stores the data in the memory 26 (S4).

Steps S3 and S4 are performed for all the first default display sections AAD1 to create the first pixel matrix data and store the first pixel matrix data in the memory 26. The correction circuit 24 determines whether step S3 is performed for all the first default display sections AAD1 (S5). If the determination result of step S5 is NO, the process returns to step S3.

If the determination result of step S5 is YES, the linking process similar to the process of step S3 is performed for the second default display sections AAD2 (S6) and data representing pixel matrix units of the pixels PX that are linked to the second display sections AA2 (the second pixel matrix data) is created and stored in the memory 26 (S7). The correction circuit 24 determines whether step S6 is performed for all the second default display sections AAD2 (S8). If the determination result of step S8 is NO, the process returns to step S6. If the determination result of step S8 is YES, the correction circuit 24 terminates the correcting process.

The first display sections AA1 and the second display sections AA2 that are defined based on the first pixel matrix data and the second pixel matrix data. The first display sections AA1 and the second display sections AA2 that are defined through the correcting process are properly opposed to the respective light exit sections EA1. Therefore, the excess and shortage of the amounts of light rays that are supplied to the first display sections AA1 and the second display sections AA2 are less likely to occur. This highly increases the reliability of improving the contrast performance and good display quality can be obtained.

In the first display sections AA1 and the second display sections AA2 that are defined through the correcting process, an image is displayed according to the following steps. First, the calculation circuit 25 performs a calculating process of calculating values representing luminance necessary for display in the first display sections AA1 and the second display sections AA2 that are defined through the correcting process. In response to receiving image signals from the image signal process circuit 19 via the correction circuit 24, the calculation circuit 25 obtains the first pixel matrix data and the second pixel matrix data stored in the memory 26 in the correcting process. The calculation circuit 25 calculates values representing luminance necessary for display in the first display sections AA1 and the second display sections AA2 based on the image signals, the first pixel matrix data, and the second pixel matrix data. The calculation circuit 25 inputs the values representing luminance to the backlight control circuit 22.

The backlight control circuit 22 controls the LED driver 23 based on the values representing luminance that is inputted by the calculation circuit 25 to control the amounts of light rays emitted by the LEDs 17. With the correcting process performed by the correction circuit 24, the first display sections AA1 and the second display sections AA2 are properly opposed to the light exit sections EA1, respectively. Therefore, even if the liquid crystal panel 11 and the backlight 16 are not physically arranged in correct positions with respect to each other and the display area AA does not match the light exit area EA, the amounts of light rays to be supplied to the first display sections AA1 and the second display sections AA2 can be controlled as designed. Therefore, good display quality can be obtained.

The calculation circuit 25 may not be connected to the image signal process circuit 19 via the correction circuit 24 but may be directly connected to the image signal process circuit 19 and may directly receive image signals from the image signal process circuit 19. The calculation circuit 25 may be connected to the memory 26. In such a configuration, the calculation circuit 25 can obtain the first pixel matrix data and the second pixel matrix data directly from the memory 26.

Next, a method of producing the liquid crystal display device 10 will be described. The method of producing the liquid crystal display device 10 includes a mounting process, a deviation detecting process, and a correcting process.

In the mounting process, the liquid crystal panel 11 is mounted on the backlight 16 and the liquid crystal display device 10 is obtained. In the obtained liquid crystal display device 10, a position error may be caused between the first default display sections AAD1 and the corresponding light exit sections EA1 and between the second default display sections AAD2 and the corresponding light exit sections EA1 due to the dimension errors of the components and the assembly errors.

If such a position error is caused, the pixels PX disposed within each of the first default display sections AAD1 include the pixels PX that are opposed to the corresponding first light exit sections EA1 and the pixels PX (first pixels PX1) that are not opposed to the corresponding first light exit sections EA1. Similar to the first default display sections AAD1, the pixels PX disposed in each of the second default display sections AAD2 also include two types of the pixels PX. The first pixels PX may be opposed to non-corresponding first light exit sections EA1 or may not be opposed any one of the light exit sections EA1. Therefore, by obtaining the position data of the first pixels PX1, the deviation direction and the deviation amount of the first default display sections AAD1 and the second default display sections AAD2 with respect to the corresponding light exit sections EA1 can be specified.

In the deviation detecting process, the non-opposed pixel data that is position data including the X-coordinates and the Y-coordinates of the first pixels PX1 in the display area AA is created and stored in the memory 26. Next, the deviation data representing the deviation direction and the deviation amount is created based on the non-opposed pixel data and stored in the memory 26. The storing of the non-opposed pixel data and the deviation data in the memory 26 may be performed by an operator who is involved in the deviation detecting process or may be performed by an inspection device or surrounding devices that are used in the deviation detecting process. If a position error is detected as a result of the inspection performed in the deviation detecting process, the correcting process is performed. If no position error is detected, the correcting process is not performed.

The correcting process that is performed when a position error is detected will be described. The correcting process that is performed when the position error illustrated in FIGS. 6 and 7 is detected will be described. In FIGS. 6 and 7, the first default display sections AAD1 and the second default display sections AAD2 are off from the corresponding light exit sections EA1 by two columns of the pixels PX in the +X-axis direction and two rows of the pixels X in the +Y-axis direction.

In the correcting process, as illustrated in FIG. 8, the first display section AA1 is defined at the position being off from the first default display section AAD1 by two columns of the pixels PX in the −X-axis direction and two rows of the pixels PX in the −Y-axis direction. Namely, the first display section AA1 is defined such that an upper edge of the first display section AA1 is next to a lower edge of a first pixel group including the first pixels PX1 that are arranged in the X-axis direction and a right edge of the first display section AA1 is next to a left edge of a second pixel group including the first pixels PX1 that are arranged in the Y-axis direction. With the first display section AA1 being defined as described above, the first display section AA1 does not include the first pixels PX1 but includes the second pixels PX2.

The first display section AA1 only includes the pixels PX that are opposed to the corresponding light exit section EA1. Therefore, the first display section AA1 and the light exit section EA1 are properly opposed to each other. Such a correcting process is performed for all the first default display sections AAD1 and all the second default display sections AAD2. Accordingly, all the first display sections AA1 and all the second display section AA2 are properly opposed to the corresponding light exit sections EA1, respectively. With the liquid crystal display device 10 being seen in the thickness direction, the borders of the first display sections AA1 matches the borders of the corresponding light exit sections EA1 and the borders of the second display sections AA2 matches the borders of the corresponding light exit sections EA1.

The position of the outline of the display area AA is unchangeable. Therefore, after the correcting process, the non-opposed pixels PX are disposed between the first display sections AA1 and the second display sections AA2 disposed next to the upper edge and the right edge of the display area AA and the upper edge and the right edge, respectively. Therefore, the first display sections AA1 and the second display sections AA2 disposed next to the upper edge and the right edge of the display area AA apparently include the non-opposed pixels PX. Namely, the areas of the first display sections AA1 and the second display sections AA2 are apparently greater than the areas of the corresponding first default display sections AAD1 and the corresponding second default display sections AAD2, respectively. On the other hand, the first display sections AA1 and the second display sections AA2 that are next to the lower edge and the left edge of the display area AA are off to the outside of the display area AA. Therefore, the numbers of pixels PX disposed in the first display sections AA1 and the second display sections AA2 that are next to the lower edge and the left edge of the display area AA are smaller than the numbers of pixels PX disposed in the corresponding first default display sections AAD1 and the corresponding second default display sections AAD2, respectively. Namely, the areas of the first display sections AA1 and the second display sections AA2 seem to be substantially smaller than the areas of the corresponding first default display sections AAD1 and the corresponding second default display sections AAD2, respectively.

As previously described, if a position error is caused between the liquid crystal panel 11 and the backlight 16, the deviation data representing the deviation direction and the deviation amount of the first default display sections AAD1 and the second default display sections AAD2 with respect to the corresponding light exit sections EA1 is created in the deviation detecting process. In the correcting process, based on the deviation data, the first display sections AA1 and the second display sections AA2 are newly defined. The first display sections AA1 and the second display sections AA2 that are newly defined are properly opposed to the light exit sections EA1, respectively. Therefore, even if the liquid crystal panel 11 and the backlight 16 are not physically arranged in correct positions with respect to each other and the display area AA does not match the light exit area EA, the amounts of light rays to be supplied to the first display sections AA1 and the second display sections AA2 can be controlled (local dimming control can be performed) as designed. Therefore, good display quality can be obtained. With the above-described method, the liquid crystal display device 10 having improved contrast performance and display quality can be provided compared to a prior technology.

Second Embodiment

A liquid crystal display device 110 and a method of producing the liquid crystal display device 110 according to a second embodiment will be described with reference to FIGS. 10 to 19. The liquid crystal display device 100 includes a liquid crystal panel 111, a backlight 116, and a control circuit 118. Portions of configurations of the liquid crystal panel 111 and the control circuit 118 are similar to those of the liquid crystal panel 11 and the control circuit 18. Configuration, operations, and effects similar to those of the first embodiment will not be described.

Figure 10:
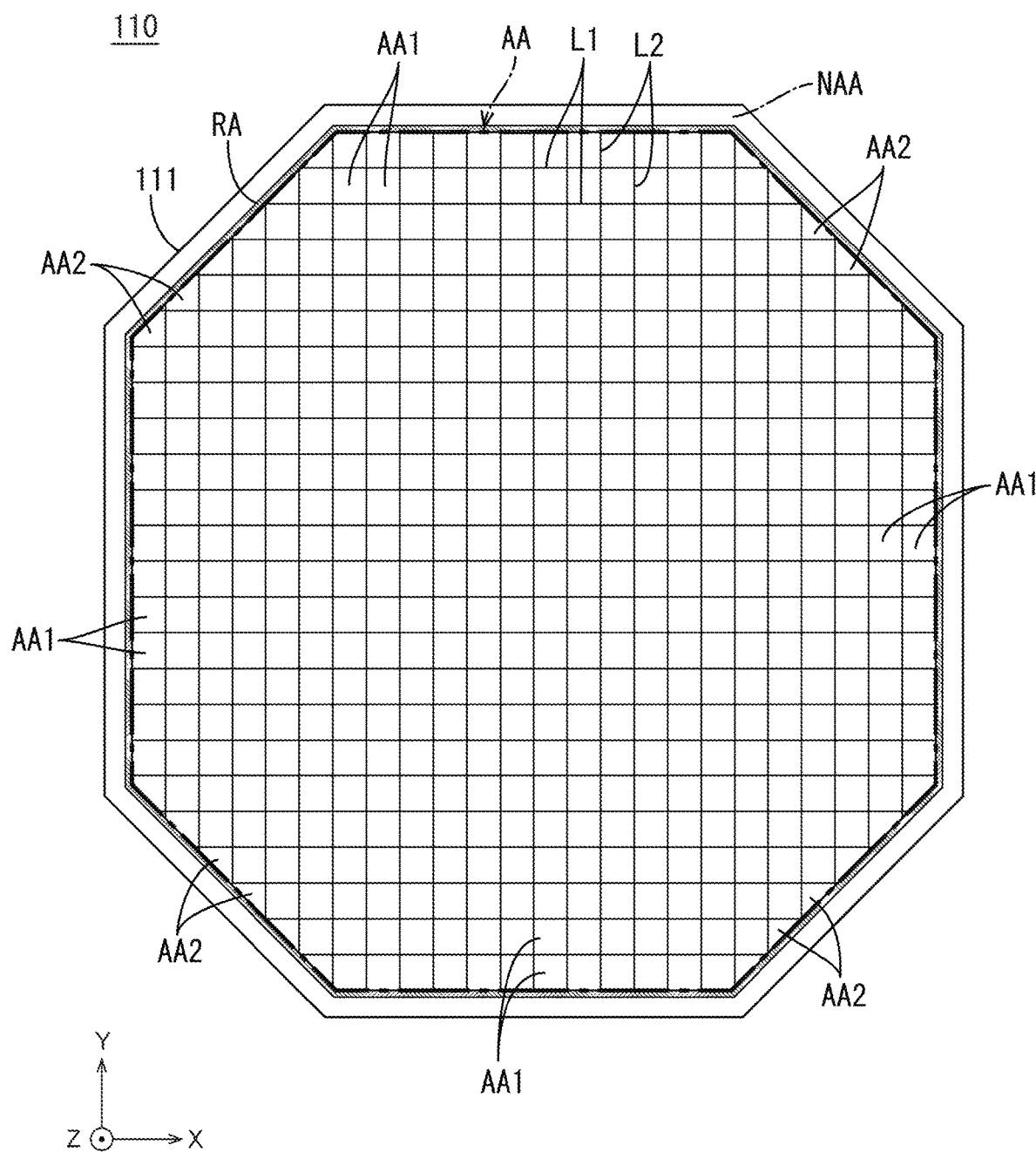
FIG. 10 is a plan view of a liquid crystal panel according to a second embodiment.
Figure 11:
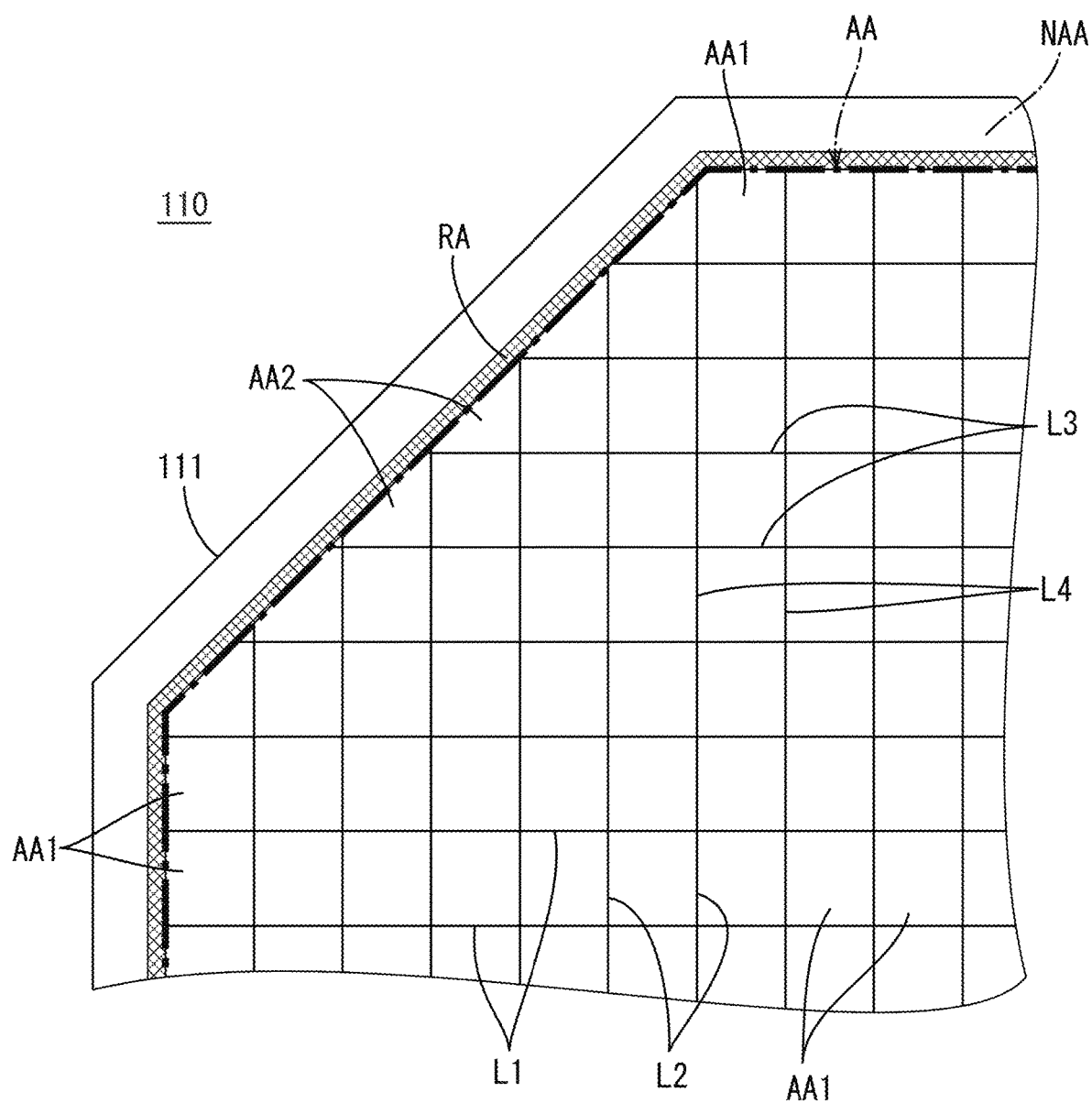
FIG. 11 is a magnified plan view of a portion of the liquid crystal panel.

As illustrated in FIGS. 10 and 11, the liquid crystal panel 111 includes the display area AA, the non-display area NAA, and an auxiliary display area RA. The auxiliary display area RA has an octagonal frame shape extending along the outline of the display area AA. The auxiliary display area RA is between the display area AA and the non-display area NAA (a portion with cross hatching in FIGS. 10 and 11).

The auxiliary display area RA is not included in the designed display area AA; however, the gate lines 12, the source lines 13, the TFTs 14, the pixel electrodes 15, the color filters, the light blocking portion (refer to FIG. 2), and the pixels PX are disposed in the auxiliary display area RA. The pixels PX disposed in the auxiliary display area RA are designed as dummy pixels that are not used for displaying. However, the dummy pixels are used for displaying when the correcting process is performed for the first default display sections AAD1 and the second default display sections AAD2 and the pixels PX disposed in the auxiliary display area RA are linked to the first display section AA1 or the second display section AA2. If such a correcting process is not performed, all the pixels PX disposed in the auxiliary display area RA are driven to display black images.

Figure 12:
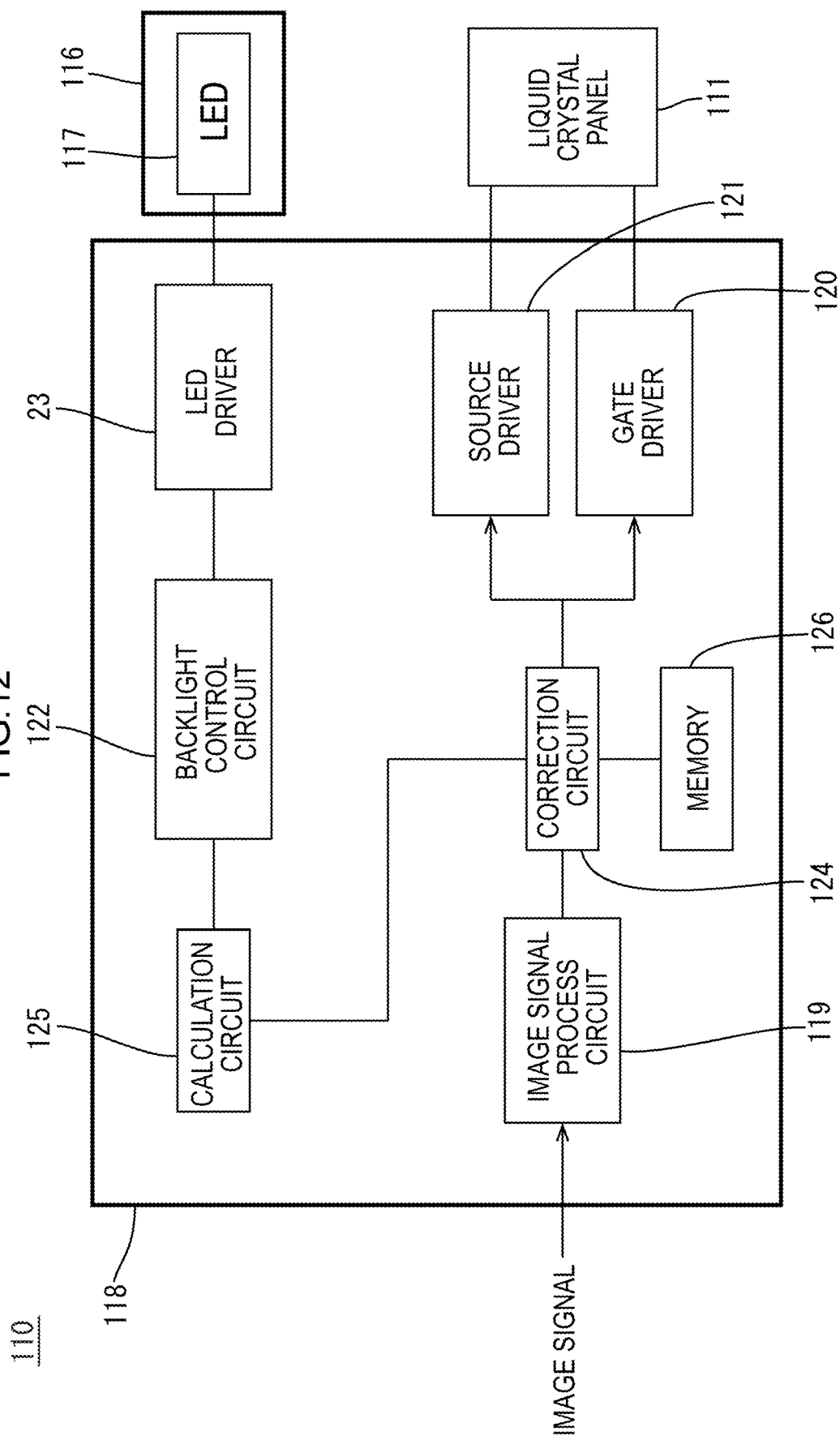
FIG. 12 is a block diagram illustrating an electric configuration of a liquid crystal display device.

As illustrated in FIG. 12, the control circuit 118 includes an image signal process circuit 119, a gate driver 120 (the display driver), a source driver 121 (the display driver), a backlight control circuit 122 (the lighting device control circuit), the LED driver 23 (the light source driver), a correction circuit 124, a calculation circuit 125, and a memory 126. The correction circuit 124 is connected to the image signal process circuit 119, the calculation circuit 125, the memory 126, the gate driver 120, and the source driver 121. The backlight control circuit 122 is connected to the calculation circuit 125 and the LED driver 23. The LED driver 23 is connected to LEDs 117.

The memory 126 stores position data of the pixels PX, the first default pixel matrix data, and the second default pixel matrix data. If a position error is caused between the liquid crystal panel 111 and the backlight 116, the memory 126 stores the non-opposed pixel data and the deviation data.

If the non-opposed pixel data is stored in the memory 126, the correction circuit 124 performs a correcting process and corrects the first default display sections AAD1 based on the deviation data and defines the first display sections AA1 that are opposed to the light exit sections EA1 and corrects the second default display sections AAD2 based on the deviation data and defines the second display sections AA2 that are opposed to the light exit section EA1. In the correcting process, the pixels PX disposed in the auxiliary display area RA may be linked to the first display section AA1 or the second display section AA2.

In the liquid crystal display device 10 according to the first embodiment, the areas of the first display sections AA1 and the second display sections AA2, which are next to the lower edge and the left edge of the display area AA, seem to be substantially smaller than the areas of the corresponding first default display sections AAD1 and the corresponding second default display sections AAD2, respectively. However, in the liquid crystal display device 110 according to this embodiment, by using the pixels PX disposed in the auxiliary display area RA, the area of the first display section AA1 and the area of the second display section AA2 that are defined in the correcting process may be defined to be same as or greater than the area of the first default display section AAD1 and the area of the second default display section AAD2, respectively.

The correction circuit 124 inputs the image signal that is processed by the image signal process circuit 119, the first pixel matrix data, and the second pixel matrix data to the calculation circuit 125. The correction circuit 124 controls the gate driver 20 and the source driver 121 to drive the pixels PX included in the first pixel matrix data and the second pixel matrix data to display an image. Namely, some of the pixels PX disposed in the auxiliary display area RA are linked to the first display section AA1 or the second display section AA2 and used for displaying an image.

With the above configuration, the area of the first display sections AA1 is same as the area of the corresponding first default display sections AAD1. The areas of the second display sections AA2 are same as the areas of the corresponding second default display sections AAD2. Therefore, display quality is further improved.

The correcting process will be specifically described. When a position error is caused between the liquid crystal panel 111 and the backlight 116, the memory 126 stores the non-opposed pixel data and the deviation data. The correction circuit 124 performs the correcting process illustrated in FIG. 15 based on the deviation data.

Figure 13:
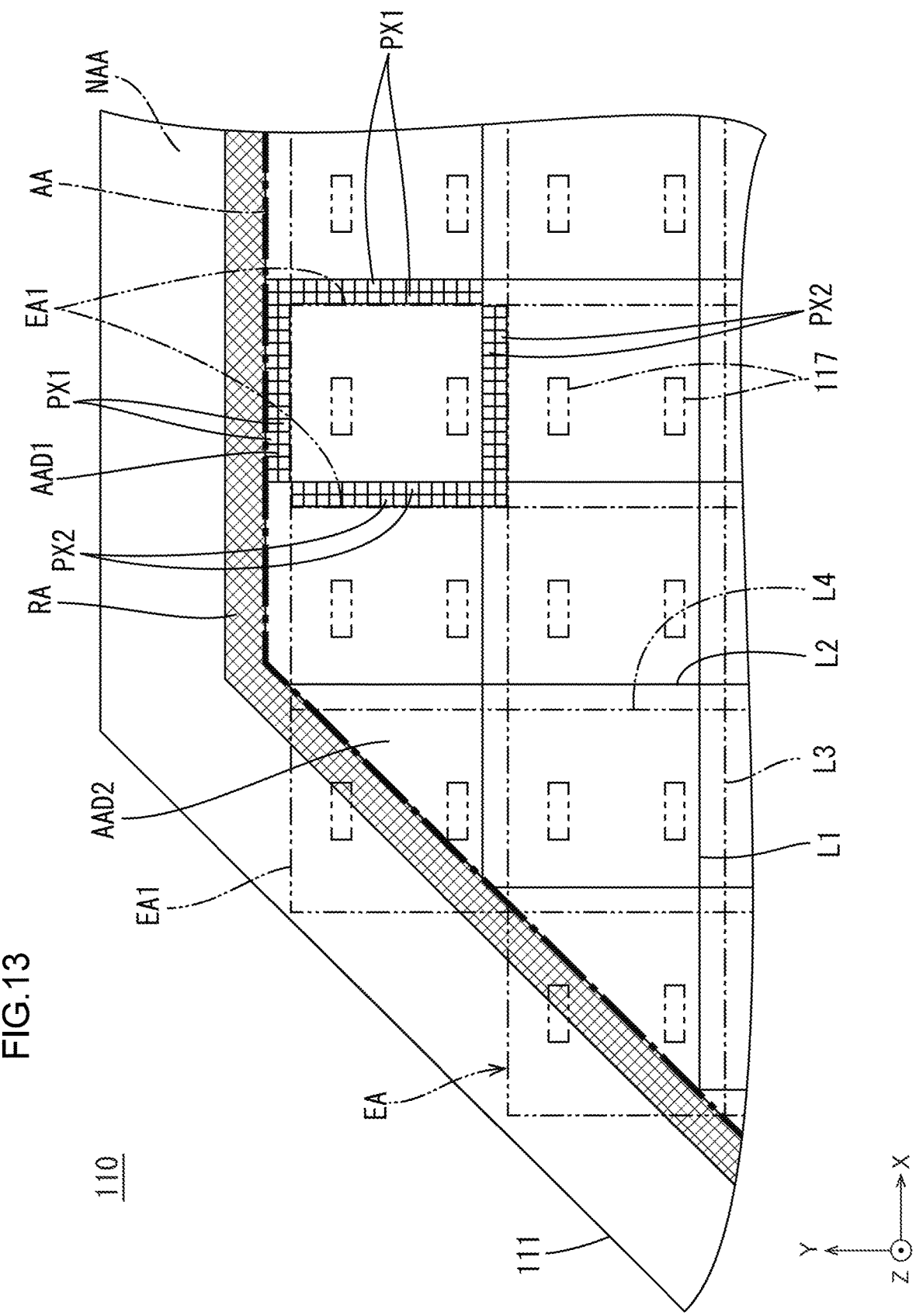
FIG. 13 is a magnified plan view illustrating an upper portion of the liquid crystal display device including the liquid crystal panel and the backlight that are arranged with a position error.
Figure 14:
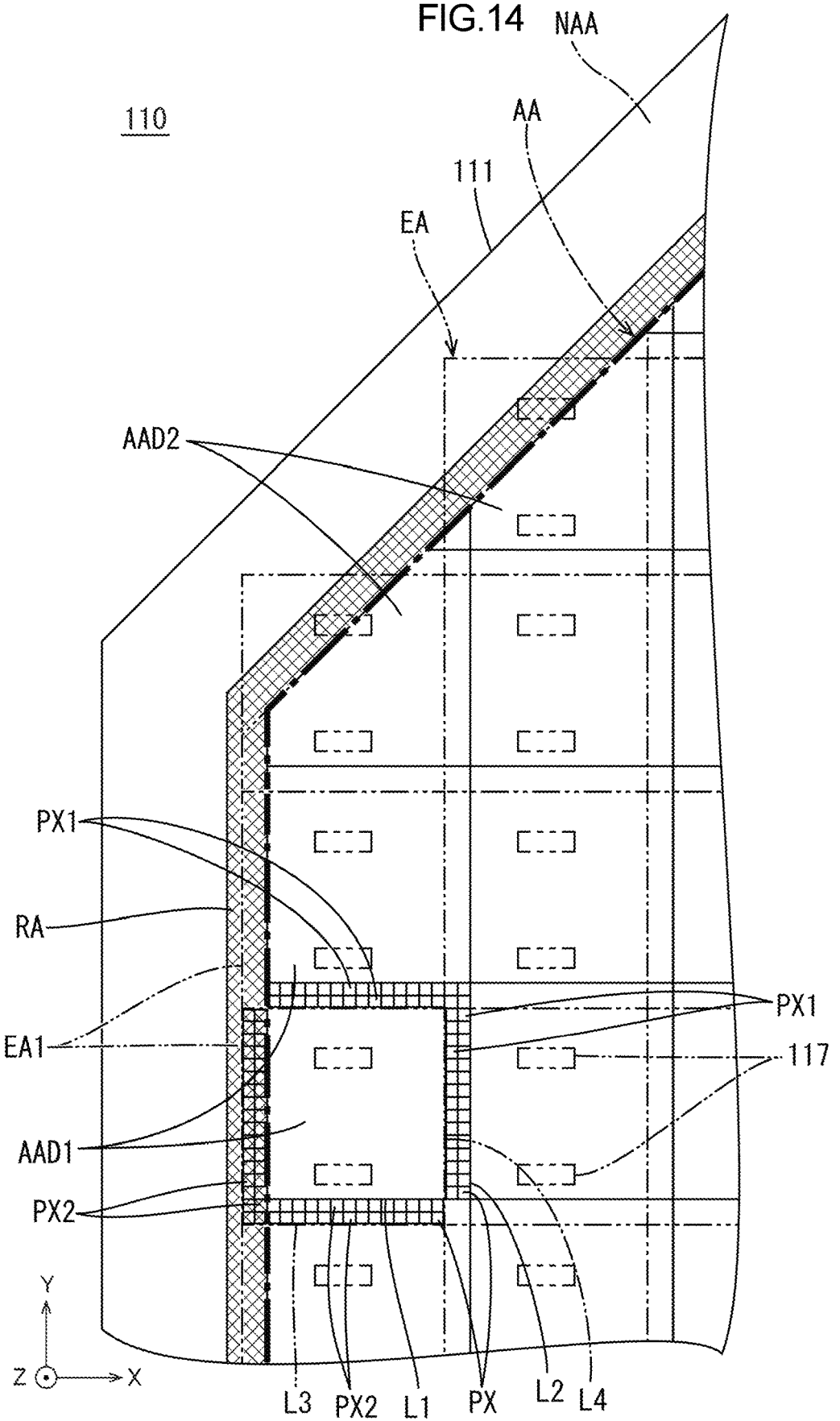
FIG. 14 is a magnified plan view illustrating a left portion of the liquid crystal display device including the liquid crystal panel and the backlight that are arranged with a position error.
Figure 15:
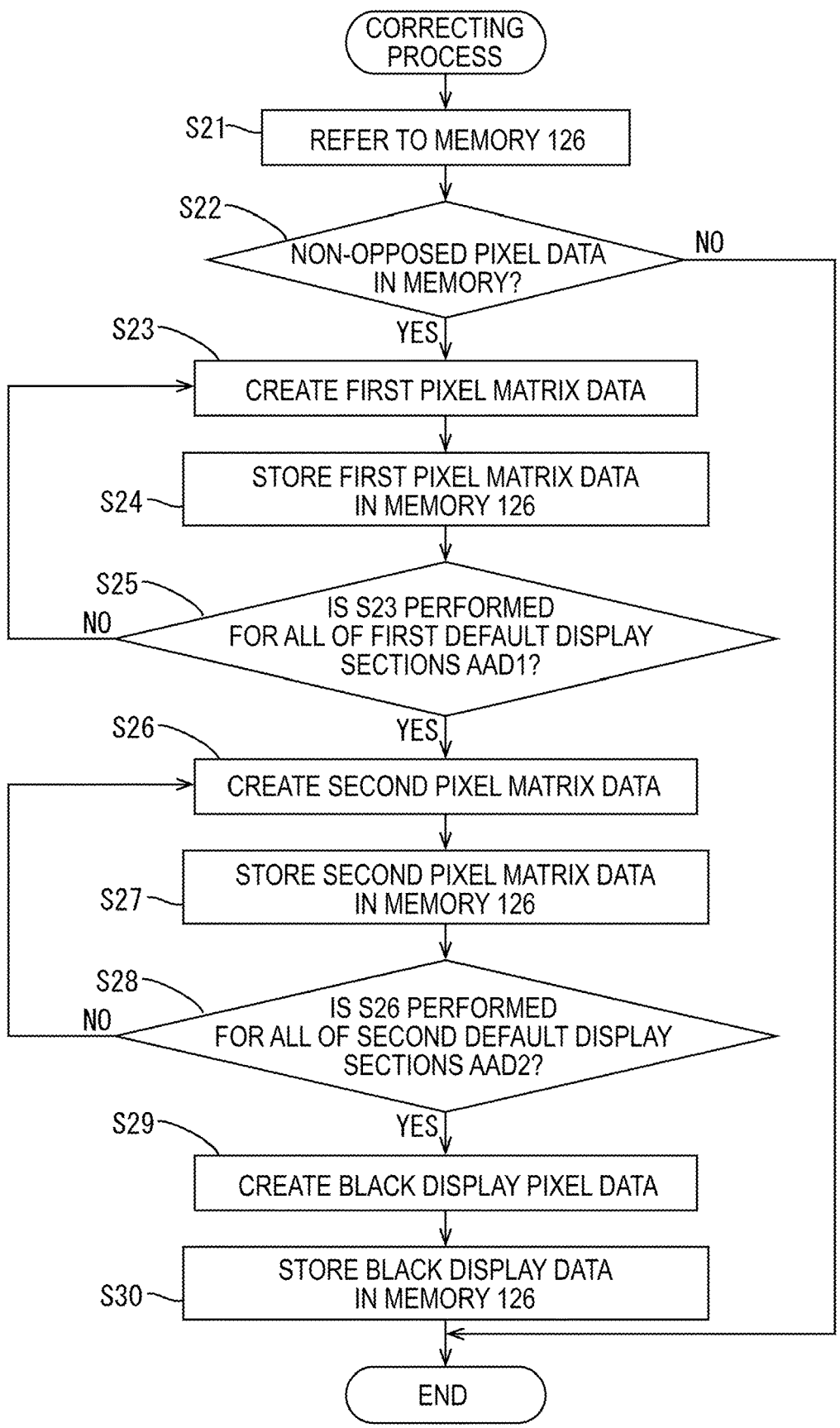
FIG. 15 is a flowchart of a correcting process.

For example, the position error illustrated in FIGS. 13 and 14 is detected. Namely, the first default display sections AAD1 and the second default display sections AAD2 are off from the corresponding light exit sections EA1 by two columns of the pixels PX in the +X-axis direction and two rows of the pixels X in the +Y-axis direction, respectively. In FIGS. 13 and 14, the first default display sections AAD1 and the second default display sections AAD2 are illustrated with solid lines. The light exit sections EA1 and the LEDs 117 are illustrated with dash-dot-dot-dash lines.

In FIG. 13, the pixels PX that are disposed in the upper first default display section AAD1 include first pixels PX1 that are not opposed to the corresponding upper light exit section EA1. The pixels PX that are not included in the upper first default display section AAD1 include second pixels PX that overlap the corresponding upper light exit section EA1. The first pixels PX1 and the second pixel PX2 are schematically illustrated.

In FIG. 14, the pixels PX that are disposed in the left first default display section AAD1 include first pixels PX1 that are not opposed to the corresponding left light exit section EA1. The pixels PX that are not included in the left first default display section AAD1 include second pixels PX that overlap the corresponding left light exit section EA1. The first pixels PX1 and the second pixels PX2 are schematically illustrated.

The correction circuit 124 refers to the memory 126 (S21) and determines whether the non-opposed pixel data is in the memory 126 (S22). If a position error is not caused, the memory 126 does not store the non-opposed pixel data (S22:NO) and the correction circuit 124 terminates the correcting process without performing any correction.

If the memory 126 stores the non-opposed pixel data (S22:YES), the memory 126 stores the deviation data representing that the first default display sections AAD1 and the second default display sections AAD2 are off from the corresponding light exit sections EA1 by two columns of the pixels PX in the +X-axis direction and two rows of the pixels PX in the +Y-axis direction.

Therefore, the correction circuit 124 corrects the first default display sections AAD1 and the second default display sections AAD2 based on the deviation data and defines the first display sections AA1 and the second display sections AA2. Namely, the correction circuit 124 performs the correction process for the first default display sections AAD1 and the second default display sections AAD2 and defines the first display sections AA1 and the second display sections AA2 at the positions that are off from the corresponding first default display sections AAD1 and the corresponding second default display sections AAD2 by two columns of the pixels PX in the −X-axis direction and two rows of the pixels PX in the −Y-axis direction.

The correction circuit 124 obtains position data of the pixels PX that are not disposed in any of the first display sections AA1 and the second display sections AA2 through the above process and creates black display pixel data. The pixels PX, which are not disposed in any of the first display sections AA1 and the second display sections AA2, are always driven to display black images based on the black display pixel data.

The correcting process performed by the correction circuit 124 will be specifically described. The correction circuit 124 selects a pixel matrix unit that is at a position being off from a pixel matrix unit (the default pixel matrix unit) included in the first default pixel matrix data by two columns of the pixels PX in the −X-axis direction and two rows of the pixels PX in the −Y-axis direction (S23). The correction circuit 124 links the pixels PX included in the selected pixel matrix unit to the first display section AA1 and creates the first pixel matrix data (S23). The correction circuit 124 selects a pixel matrix unit that is at a position being off from a pixel matrix unit included in the second default pixel matrix data by two columns of the pixels PX in the −X-axis direction and two rows of the pixels PX in the −Y-axis direction (S26). The correction circuit 124 links the pixels PX included in the selected pixel matrix unit to the second display section AA2 and creates the second pixel matrix data (S26). The correction circuit 124 stores the first pixel matrix data and the second pixel matrix data in the memory 126 (S24, S27).

Figure 19:
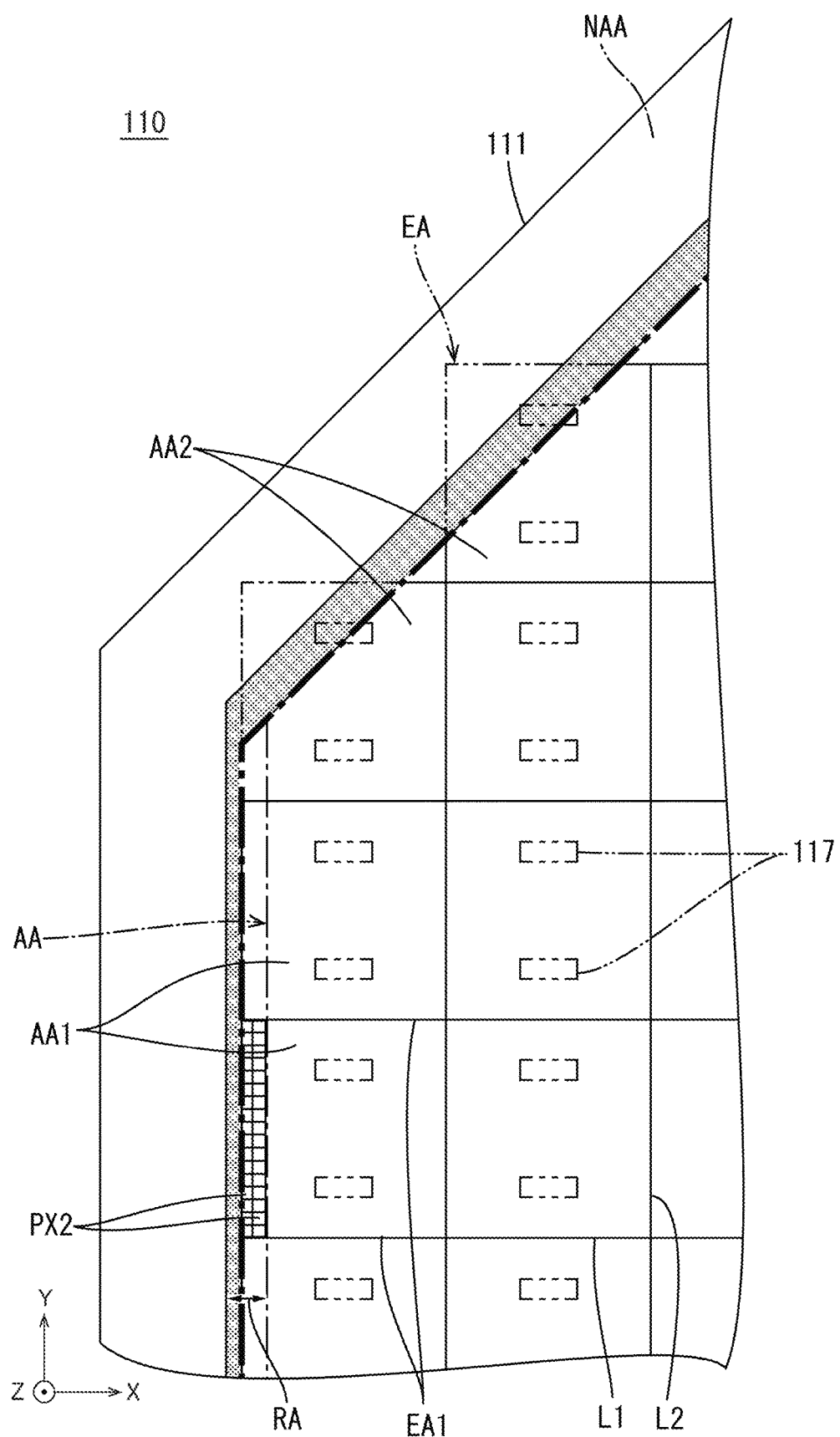
FIG. 19 is a magnified view of a left portion of the liquid crystal display device after the correcting process.

As illustrated in FIGS. 14 and 19, some of the pixels PX disposed in the first display section AA1, which is defined by correcting the left first default display section AAD1, are disposed in the auxiliary display area RA. In this embodiment, such pixels PX disposed in the auxiliary display area RA are linked to the first display section AA1. The first embodiment does not include such pixels PX and therefore, the number of pixels PX that are linked to the first display section AA1 is smaller than the number of pixels PX that are linked to the corresponding first default display section AAD1. The area of the first display section AA1 seems to be substantially reduced. In this embodiment, the number of pixels PX that are linked to the above first display section AA1 is same as the number of pixels that are linked to the first default display section AAD1. Therefore, the area of the first display section AA1 is same as the area of the first default display section AAD1.

Figure 16:
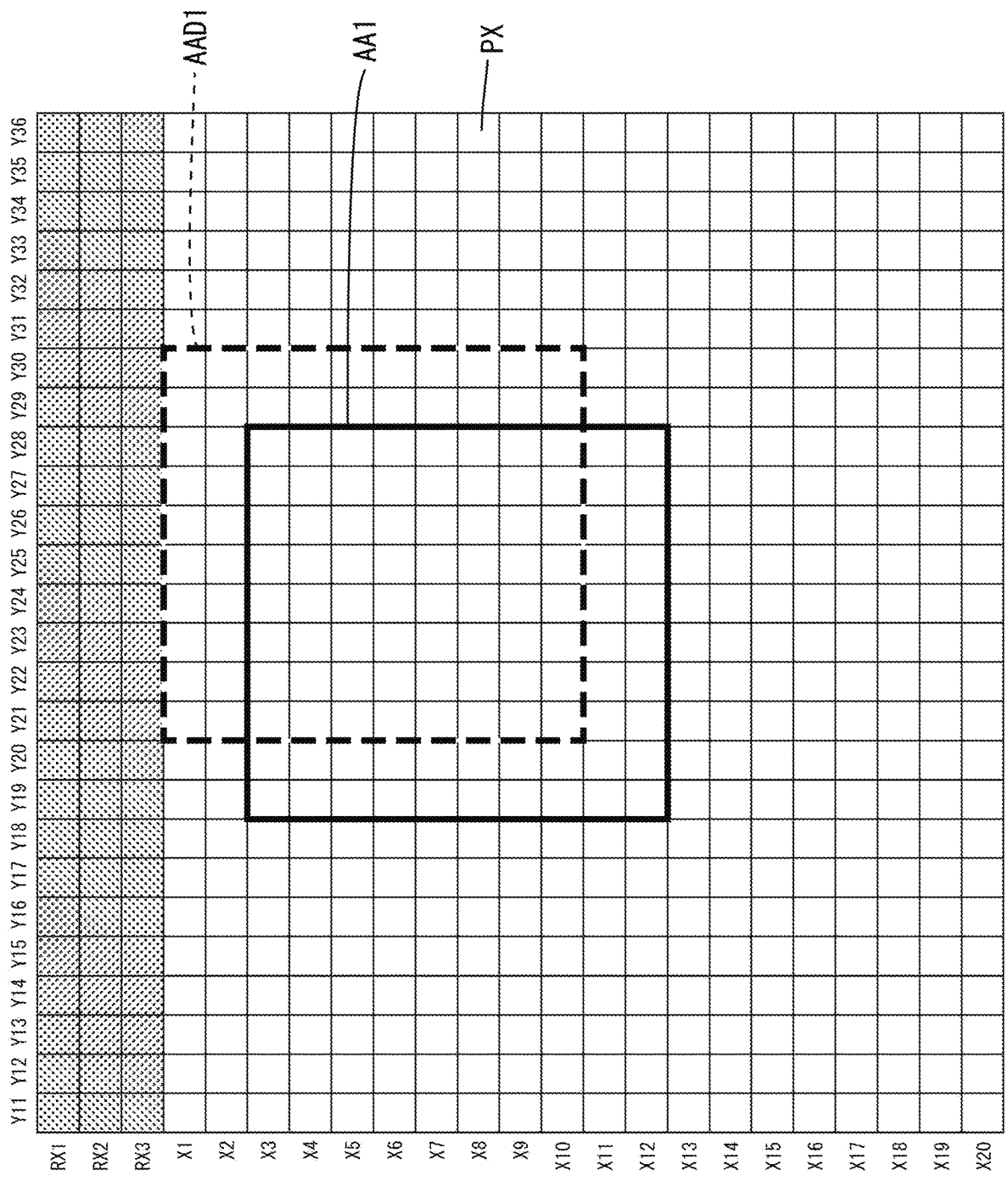
FIG. 16 is a general view illustrating pixel matrix, a default display section, and a display section in an upper portion of the liquid crystal panel.
Figure 17:
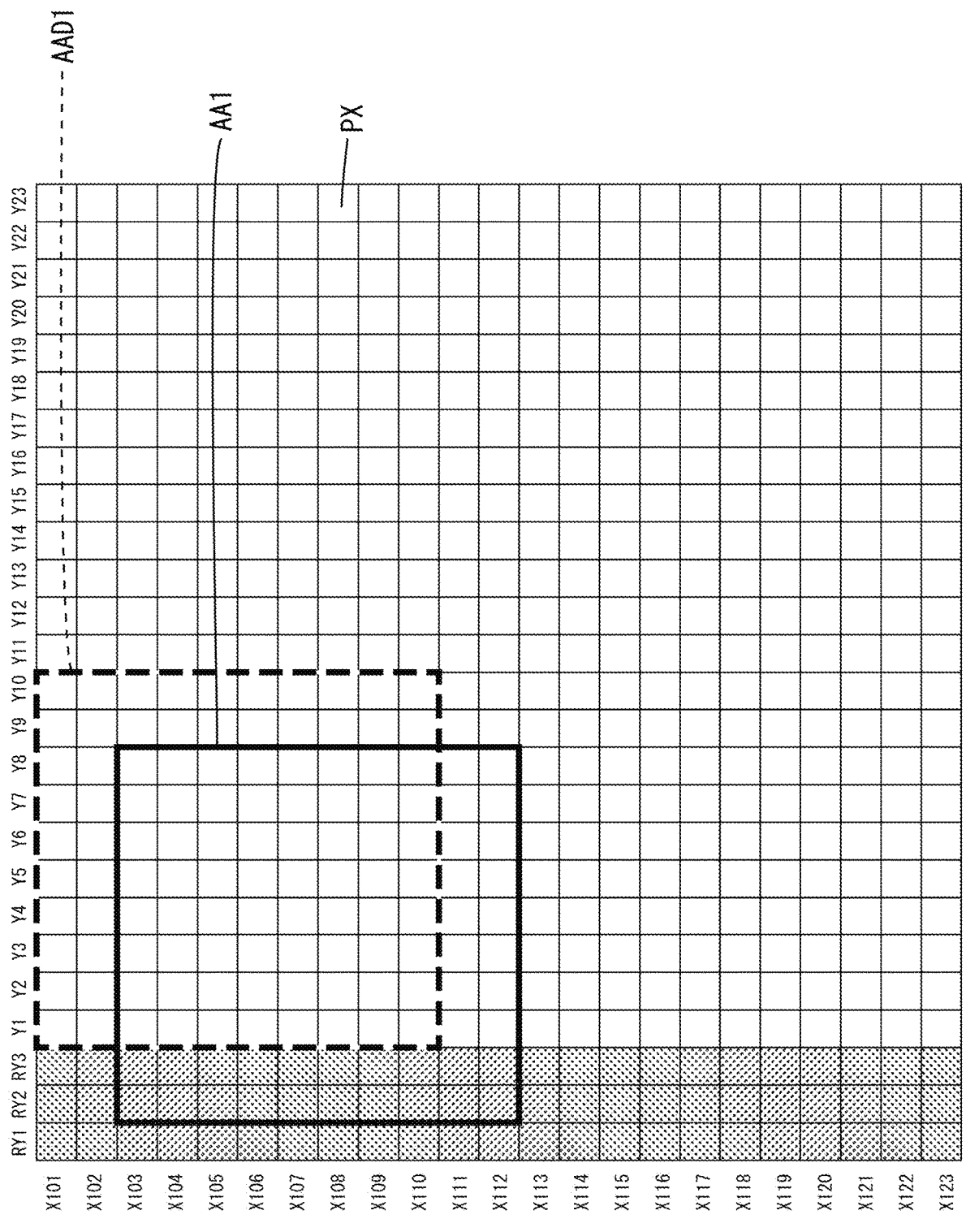
FIG. 17 is a general view illustrating the pixel matrix, a default display section, and a display section in a left portion of the liquid crystal panel.

The process of creating the first pixel matrix data and the second pixel matrix data will be specifically described with reference to FIGS. 13 to 17. For simplifying the description, the process of correcting the upper first default display section AAD1 in FIG. 13 and the left first default display section AAD1 in FIG. 14 will be described with reference to FIGS. 15 to 17. FIGS. 16 and 17 illustrate an example of the first default display section AAD1 and an example of the first display section AA1, respectively. The examples in FIGS. 16 and 17 differ from the actual first default display section AAD1 and the actual first display section AA1 in the number of the pixels PX, row numbers, and column numbers. The row numbers (RX1-RX3, X1-X23, X101-X123) and the column numbers (RY1-RY3, Y1-Y36) are provided for the explanation.

First, the process of correcting the upper first default display section AAD1 in FIG. 13 will be described. The pixel matrix of the pixels PX in the rows X1-X10 and the columns Y21-Y30 in FIG. 16 are linked to the first default display section AAD1 (the first default pixel matrix data).

Based on the deviation data, the correction circuit 124 links the pixel matrix unit (the opposed pixel matrix unit) including the pixels PX in the rows X3-X12 and the columns Y19-Y28 to the first display section AA1 opposed to the light exit section EA1 (S23) and creates the first pixel matrix data (S23) and stores the data in the memory 126 (S24).

The pixels PX in the rows X1 and X2 and the columns Y21-Y30 that are next to the upper edge of the first default display section AAD1 are not linked to any of the first display sections AA1 and not used for displaying an image. The correction circuit 124 creates black display pixel data, which is the position data of such pixels PX (S29), and stores the black display pixel data in the memory 126 (S30).

Next, the process of correcting the left first default display section AAD1 in FIG. 14 will be described. The pixel matrix of the pixels PX in the rows X101-X110 and the columns Y1-Y10 in FIG. 17 are linked to the first default display section AAD1 (the first default pixel matrix data).

Based on the deviation data, the correction circuit 124 links the pixel matrix including the pixels PX in the rows X103-X112 and the columns RY12-Y8 to the first display section AA1 opposed to the light exit section EA1 (S23). The correction circuit 124 creates the first pixel matrix data representing the rows and columns of the pixels PX that are linked to the first display section AA1 (S23) and stores the first pixel matrix data in the memory 126 (S24).

The pixels PX of the rows X103-X112 and the columns RY2 and RY3 that are next to the left edge of the first default display section AAD1 are disposed in the auxiliary display area RA. The first embodiment does not include such pixels PX and the first display section AA1 is only linked to the pixels PX of the rows X103-X112 and the columns Y1-Y8. Therefore, a substantial area of the first display section AA1 is reduced compared to the corresponding first default display section AAD1 in the first embodiment.

In this embodiment, the pixels PX that are disposed in the auxiliary display area RA are also linked to the first display section AA1. Therefore, the pixels PX of the same number of pixels that are linked to the corresponding first default display section AAD1 are linked to the first display section AA1. The area of the first display section AA1 is substantially same as the area of the corresponding first default display section AAD1.

The correction circuit 124 performs step S23 for all the first default display sections AAD1 and stores the first pixel matrix data of all the first display sections AA1 in the memory 126. The correction circuit 124 determines whether step S23 is performed for all the first default display sections AAD1 (S25). If the determination result of step S25 is NO, the process returns to step S23.

If the determination result of step S25 is YES, the linking process similar to the process of step S23 is performed for the second default display sections AAD2 (S26) and data representing pixel matrix of the pixels PX that are linked to the second display section AA2 (the second pixel matrix data) is created and stored in the memory 126 (S27). The correction circuit 124 determines whether step S26 is performed for all the second default display sections AAD2 (S28). If the determination result of step S28 is NO, the process returns to step S36. If the determination result of step S28 is YES, the correction circuit 124 creates the black display pixel data representing the pixels PX that are not linked to the first display section AA1 or the second display section AA2 (S29), and stores the black display pixel data in the memory 126 (S30) and terminates the correcting process.

The correction circuit 124 inputs the first pixel matrix data, the second pixel matrix data, and the image signals to the calculation circuit 125. The calculation circuit 125 calculates values representing luminance necessary for display in the first display sections AA1 and the second display sections AA2 based on the inputted data and image signals. The calculation circuit 125 inputs data including the calculated values to the backlight control circuit 122.

The backlight control circuit 122 controls the amounts of light rays exiting through the respective light exit sections EA1 based on the input from the calculation circuit 125. Accordingly, the amounts of light rays that are appropriate for the luminance of the respective first display sections AA1 and the second display sections AA2 are supplied from the respective light exit sections EA1. Therefore, the excess and shortage of the amounts of light rays supplied to the first display sections AA1 and the second display sections AA2 from the corresponding light exit sections EA1 are less likely to occur. The local dimming control is properly performed and the reliability of improving the contrast performance is highly increased and good display quality can be obtained.

The correction circuit 124 inputs the first pixel matrix data, the second pixel matrix data, the black display pixel data, and the image signals from the image signal process circuit 119 to the gate driver 120 and the source driver 121. The gate driver 120 and the source driver 121 drive the pixels PX included in the first pixel matrix data and the second pixel matrix data to display an image based on the inputted data and the image signals.

Figure 18:
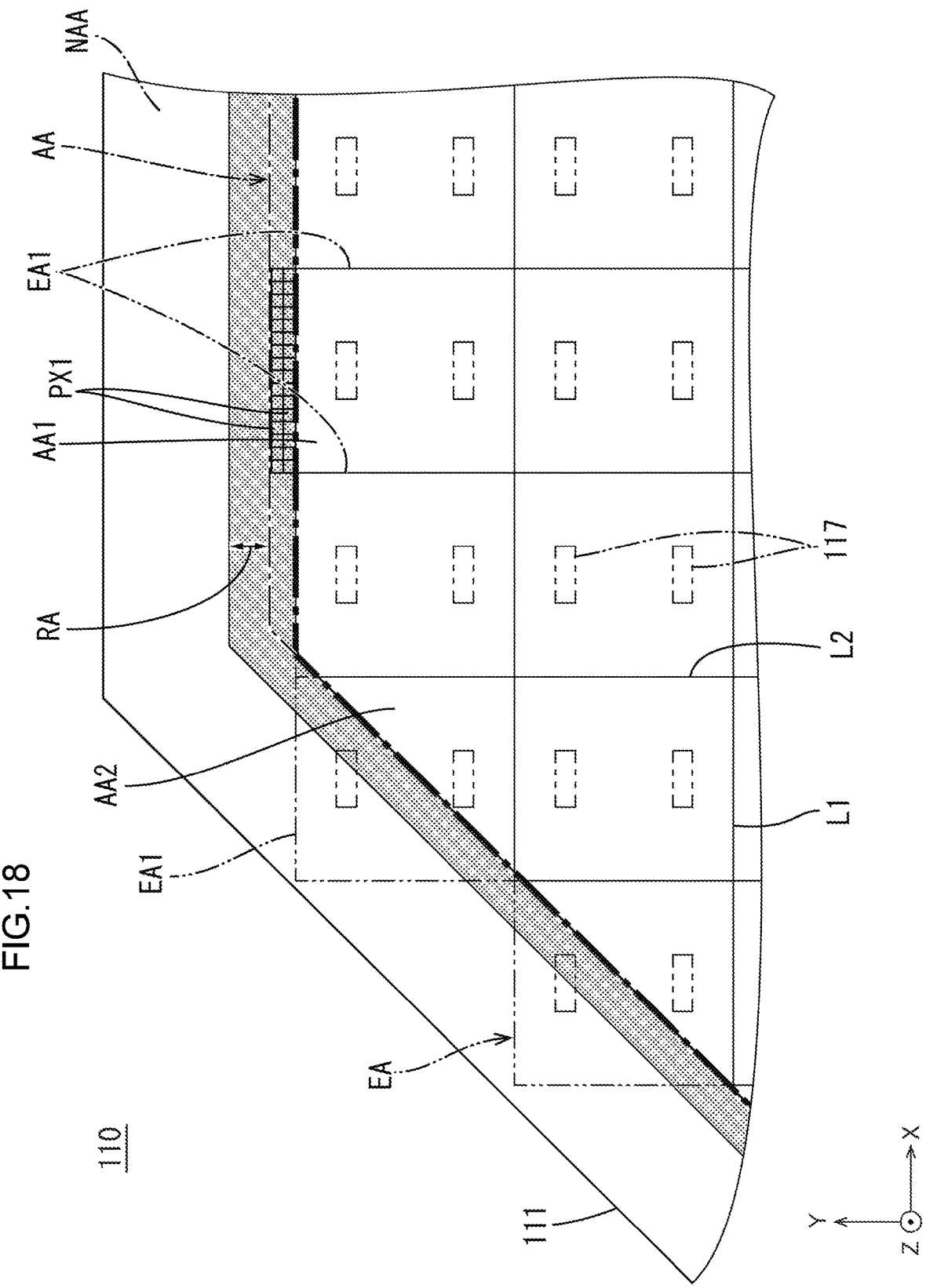
FIG. 18 is a magnified view of an upper portion of the liquid crystal display device after the correcting process.

The gate driver 120 and the source driver 121 drive the pixels PX included in the black display pixel data to display a black image irrespective of the image signals. In FIGS. 18 and 19, the area displaying the black image is illustrated with dot shading.

With the above configuration, the first display sections AA1 and the second display sections AA2 can be properly opposed to the light exit sections EA1, respectively. The areas of the first display sections AA1 can be equal to or greater than the areas of the first default display sections AAD1, respectively, and the areas of the second display sections AA2 can be equal to or greater than the areas of the second default display sections AAD2, respectively. Furthermore, the pixels PX that are not used for displaying images are driven to display a black image irrespective of the image signals. Accordingly, the display quality of the image displayed in each of the first display sections AA1 and the second display sections AA2 is further improved.

The calculation circuit 125 may be directly connected to the image signal process circuit 19 and the processed image signals may be directly inputted to the calculation circuit 125. The calculation circuit 125 may be connected to the memory 126. With such a configuration, the calculation circuit 125 can directly obtain the first pixel matrix data and the second pixel matrix data from the memory 126.

Next, a method of producing the liquid crystal display device 110 will be described. The mounting process, which is similar to that of the liquid crystal display device 10 of the first embodiment, will not be described and the deviation detecting process and the correcting process will be described. To simplify the description, the processes will be described with the position error illustrated in FIGS. 13 and 14 being caused. Namely, the first default display section AAD1 and the second default display section AAD2 are off from the corresponding light exit sections EA1 by two columns of the pixels PX in the +X-axis direction and two rows of the pixels X in the +Y-axis direction.

In the deviation detecting process, it is determined whether the pixels PX included in the first default display sections AAD1 and the second default display sections AAD2 include any first pixel PX1 that is not opposed to the corresponding light exit sections EA1. If the determination result is YES, the non-opposed pixel data, which is position data including X-coordinates and Y-coordinates of the first pixel PX1 in the display area AA, is created and stored in the memory 126.

Next, the deviation direction and the deviation amount are determined based on the non-opposed pixel data. The deviation data representing the deviation direction and the deviation amount is created and stored in the memory 126. The storing of the non-opposed pixel data and the deviation data in the memory 126 may be performed by an operator who is involved in the deviation detecting process or may be performed by an inspection device or surrounding devices that are used in the deviation detecting process. If any position error is detected as a result of the inspection performed in the deviation detecting process, the correcting process is performed. If no position error is detected, the correcting process is not performed.

The correcting process that is performed when the position error illustrated in FIGS. 13 and 14 is detected will be described. The non-opposed pixel data stored in the memory 126 represents that the two columns of the pixels PX and the two rows of the pixels PX are not opposed to the light exit sections EA1. The deviation data represents that the first default display sections AAD1 are off from the corresponding light exit sections EA1 by two columns of the pixels PX in the +X-axis direction and two rows of the pixels X in the +Y-axis direction.

In the correcting process, the first display sections AA1 are defined at the positions that are off from the corresponding first default display sections AAD1 by two columns of the pixels PX in the −X-axis direction and two rows of the pixels PX in the −Y-axis direction. As illustrated in FIGS. 13 and 14, the light exit sections EA1 that are disposed near the left edge and the oblique edge of the liquid crystal panel 111 are partly opposed to the auxiliary display area RA. The oblique edge extends between the upper edge and the left edge. Namely, out of the pixels PX that are not included in the first default display sections AAD1 or the second default display sections AAD2, some of the second pixels PX2 that are opposed to the light exit sections EA1 are disposed in the auxiliary display area RA. Other first pixels PX1 and second pixels PX2 are disposed in the display area AA.

With the first default display sections AAD1 and the second default display sections AAD2 being corrected as described above, among the defined first display sections AA1 and the defined second display sections AA2, the first display sections AA1 and the second display sections AA2 that are disposed next to the left edge and the oblique edge of the liquid crystal panel 111 include the pixels PX that are disposed in the display area AA and the pixels PX that are disposed in the auxiliary display area RA. Namely, each of the first display sections AA1 includes the same number of pixels PX that are included in each of the first default display sections AAD1. Each of the second display sections AA2 includes the same number of pixels PX that are included in each of the corresponding second default display sections AAD2.

In the first embodiment, as a result of the above-described correction, the number of pixels PX included in the first display section AA1 is reduced from the number of pixels PX included in the corresponding first default pixel matrix data. The second display section AA2 is similar. In this embodiment, the number of pixels PX included in the first display sections AA1 is same as the number of pixels PX included in the corresponding first default display sections AAD1, respectively. The second display sections AA2 are similar. This provides further improved display quality.

Out of the first display sections AA1 that are defined in the correcting process, the first display sections AA1 that are next to the upper edge of the liquid crystal panel 11 do not include the first pixels PX1 that are next to the upper edge. Namely, out of the pixels PX that are disposed in the design display area AA, the first pixels PX1 that are next to the upper edge are not included in the display area AA including the defined first display sections AA1 and the defined second display sections AA2. In the correcting process, the black display pixel data, which is position data of the pixels PX not included in the display area AA, is created and stored in the memory 126. The pixels PX included in the display pixel data are driven to always display a black image irrespective of the image signals.

With the above method, the first display sections AA1 and the second display sections AA2 that are defined based on the deviation data can be properly opposed to the corresponding light exit sections EA1, respectively. Therefore, even if the liquid crystal panel 11 and the backlight 16 are not physically arranged in correct positions with respect to each other and the display area AA does not match the light exit area EA, the amounts of light rays to be supplied to the first display sections AA1 and the second display sections AA2 can be controlled (local dimming control can be performed) as designed. The liquid crystal display device 110 having improved contrast performance and display quality can be provided compared to a prior technology.

The first display sections AA1 and the second display sections AA2 that are defined through the correcting process include the pixels PX disposed in the auxiliary display area RA. Therefore, the number of pixels PX that are actually used for displaying images is same as the designed number of pixels. Therefore, compared to the first embodiment, the liquid crystal display device 110 of this embodiment improves the contrast performance and display quality.

Since the black display pixel data is stored in the memory 126, the pixels PX that are not used for actual image display are driven to display a black image and this further improves display quality.

Third Embodiment

A liquid crystal display device 210, and a brightness uniformizing process and a deviation detecting process included in a method of producing the liquid crystal display device 210 according to a third embodiment will be described with reference to FIGS. 20 to 24. Configurations, operations, and effects similar to those of the second embodiment will not be described.

Figure 20:
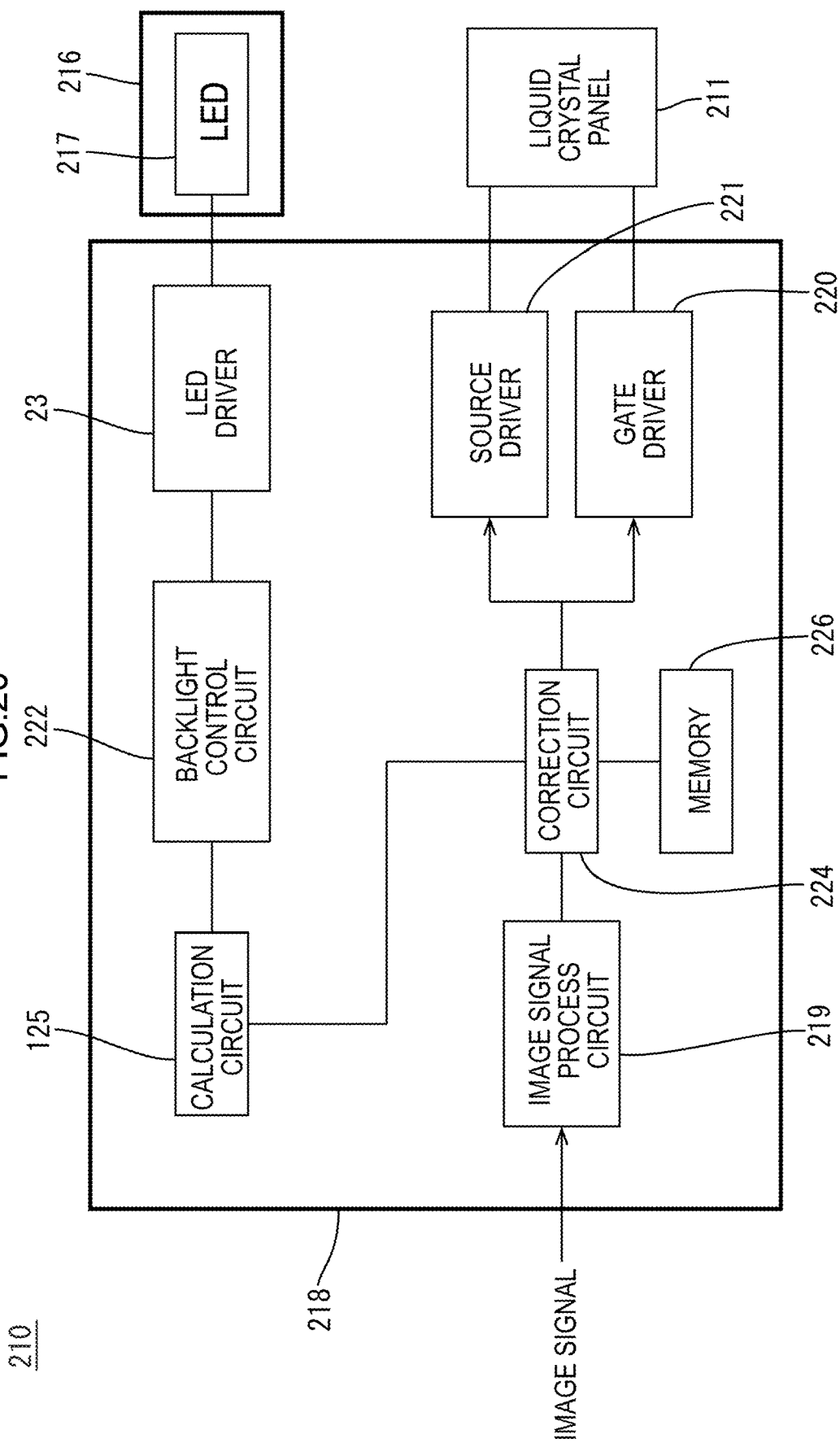
FIG. 20 is a block diagram illustrating an electric configuration of a liquid crystal display device according to a third embodiment.

As illustrated in FIG. 20, the liquid crystal display device 210 includes a liquid crystal panel 211, a backlight 216, and a control circuit 218. The backlight 216 includes LEDs 217. The control circuit 218 includes an image signal process circuit 219, a gate driver 220 (the display driver), a source driver 221 (the display driver), a backlight control circuit 222 (the lighting device control circuit), the LED driver 23 (the light source driver), a correction circuit 224, a calculation circuit 125, and a memory 226.

The correction circuit 224 is connected to the image signal process circuit 219, the calculation circuit 125, the memory 226, the gate driver 220, and the source driver 221. The gate driver 220 and the source driver 221 are connected to the correction circuit 224 and the liquid crystal panel 211. The backlight control circuit 222 is connected to the calculation circuit 125 and the LED driver 23. The LED driver 23 is connected to LEDs 217.

In the liquid crystal display device 210, prior to the correcting process illustrated in FIG. 9, the brightness uniformizing process and the deviation detecting process are performed. First, the brightness uniformizing process will be described.

The backlight control circuit 222 controls the LED driver 23 to turn on all the LEDs 217 and display with white in all the first display sections AA1 and the second display sections AA2 of the liquid crystal panel 211. Brightness of the first display sections AA1 and the second display sections AA2 is measured by an external device that is connected to the control circuit 218. The first display sections AA1 and the second display sections AA2 having brightness higher than a predefined value are specified by the external device and first brightness correction data that includes position data of the specified sections is created. The first display sections AA1 and the second display sections AA2 having brightness lower than the predefined value are specified by the external device and second brightness correction data is created.

The control circuit 218 receives the first brightness correction data and the second brightness correction data from the external device. The control circuit 218 drives the LED driver 23 to reduce the amount of light rays emitted by the corresponding LEDs 217 based on the first brightness correction data. The control circuit 218 drives the LED driver 23 to increase the amount of light rays emitted by the corresponding LEDs 217 based on the second brightness correction data. Accordingly, the brightness uniformity is achieved in the display area AA of the liquid crystal panel 211. By performing the brightness uniformizing process, the detection accuracy of the deviation detecting process, which is subsequently performed, is increased compared to the detection accuracy without performing the brightness uniformizing process.

The memory 226 stores specified light exit section data that represents the light exit sections EA1 through which light exits in the deviation detecting process. The memory 226 further stores specified display section data that represents the first display sections AA1 through which light passes in the deviation detecting process.

The specified light exit section data includes position data of the specified light exit sections EA1A, EA1B, EA1C, EA1D, EA1E, EA1F, EA1G, EA1H, EA1I, EA1J, EA1K, EA1L, EA1M, EA1N, EA1P, EA1Q, EA1R, EA1S, EA1T, EA1U, EA1V, and EA1W that are specified such that light exits the specified light exit sections in the deviation detecting process.

With reference to the specified light exit section EA1A that is disposed in a middle of the light exit area EA, the specified light exit sections EA1B to EA1W are disposed at upper, lower, left, right, upper right, upper left, lower right, and lower left positions. The specified light exit section EA1A in the middle is defined as a reference light exit section EA1A. The specified light exit sections EA1B to EA1W other than the reference light exit section EA1A are specified as follows. With respect to the reference light exit section EA1A, the light exit section EA1 in every three light exit sections EA1 in an X-axis direction, a Y-axis direction, a first direction XY1, and a second direction XY2 is selected and the selected light exit sections EA1 are defined as the specified light exit sections EA1B to EA1W. The light exit section EA1 is not necessarily selected in every three light exit sections but may be in every two light exit sections, every four light exit sections, or more.

In this embodiment, for example, the four specified light exit sections EA1B, EA1E, EA1H, EA1L that are disposed on upper, lower, left, and right sides with respect to the reference light exit section EA1A are away from the reference light exit section EA1A with a same distance. The four specified light exit sections EA1C, EA1F, EA1J, EA1M that are disposed on an outer side with respect to the specified light exit sections EA1B, EA1E, EA1H, EA1L are away from the reference light exit section EA1A with a same distance.

Figure 21:
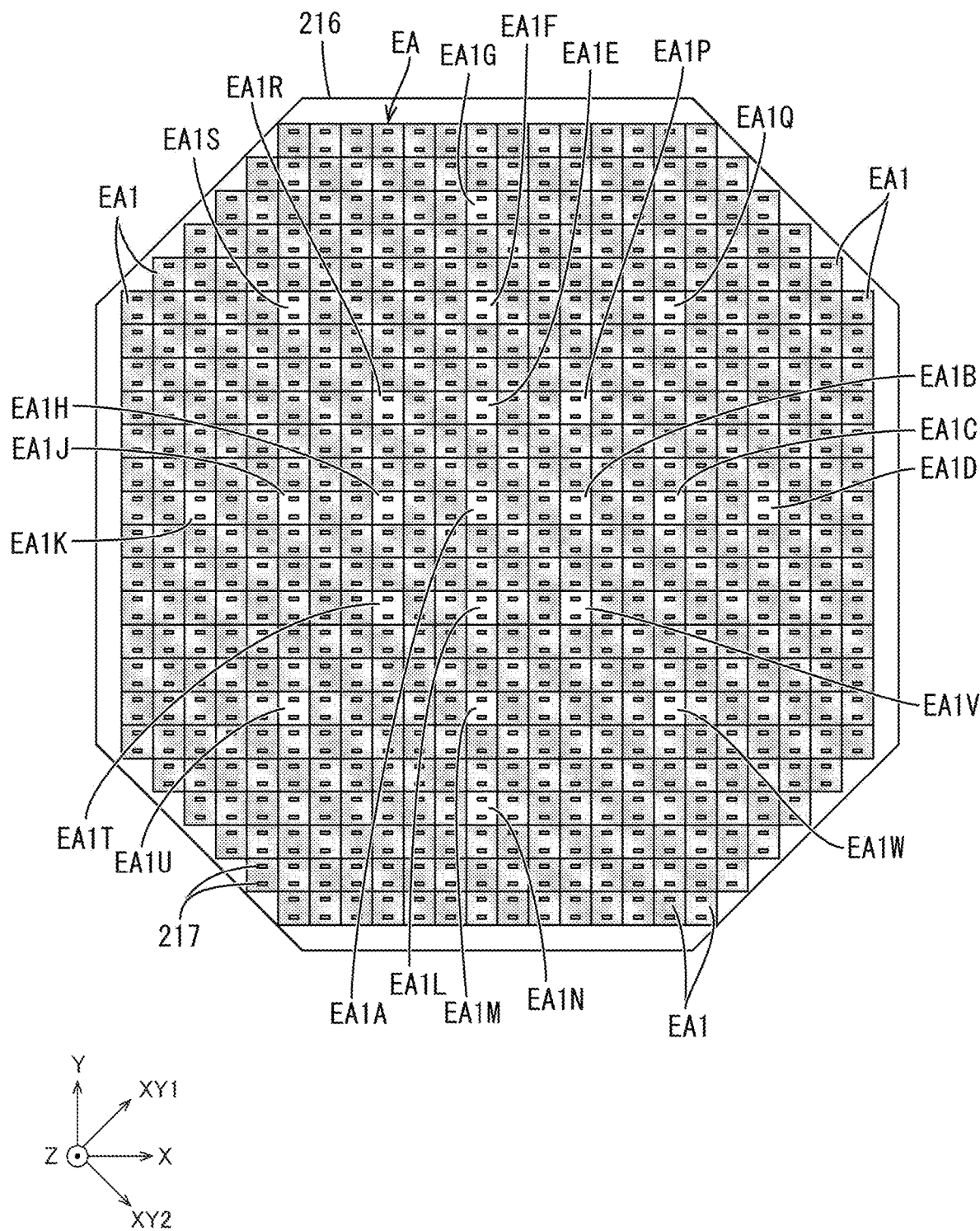
FIG. 21 is a plan view of the backlight including specified light exit sections that light exits.

The backlight control circuit 222 controls the LED driver 23 to turn on the LEDs 217 corresponding to the specified light exit sections such that light exits the specified light exit sections EA1A to EA1Y. In FIG. 21, the specified light exit sections EA1A to EA1Y are illustrated with white and other light exit sections EA1 are illustrated with dot shading.

The specified display section data includes position data of the specified display sections AA1A, AA1B, AA1C, AA1D, AA1E, AA1F, AA1G, AA1H, AA1I, AA1J, AA1K, AA1L, AA1M, AA1N, AA1P, AA1Q, AA1R, AA1S, AA1T, AA1U, AA1V, and AA1W. The position data of the above specified display sections are defined based on the first default display sections AAD1 corresponding to the specified light exit sections EA1A to EA1Y and used in the deviation detecting process. The specified display section AA1A is disposed in a middle of the display area AA and corresponds to the reference light exit section EA1A and defined as a reference display section AA1A.

Figure 22:
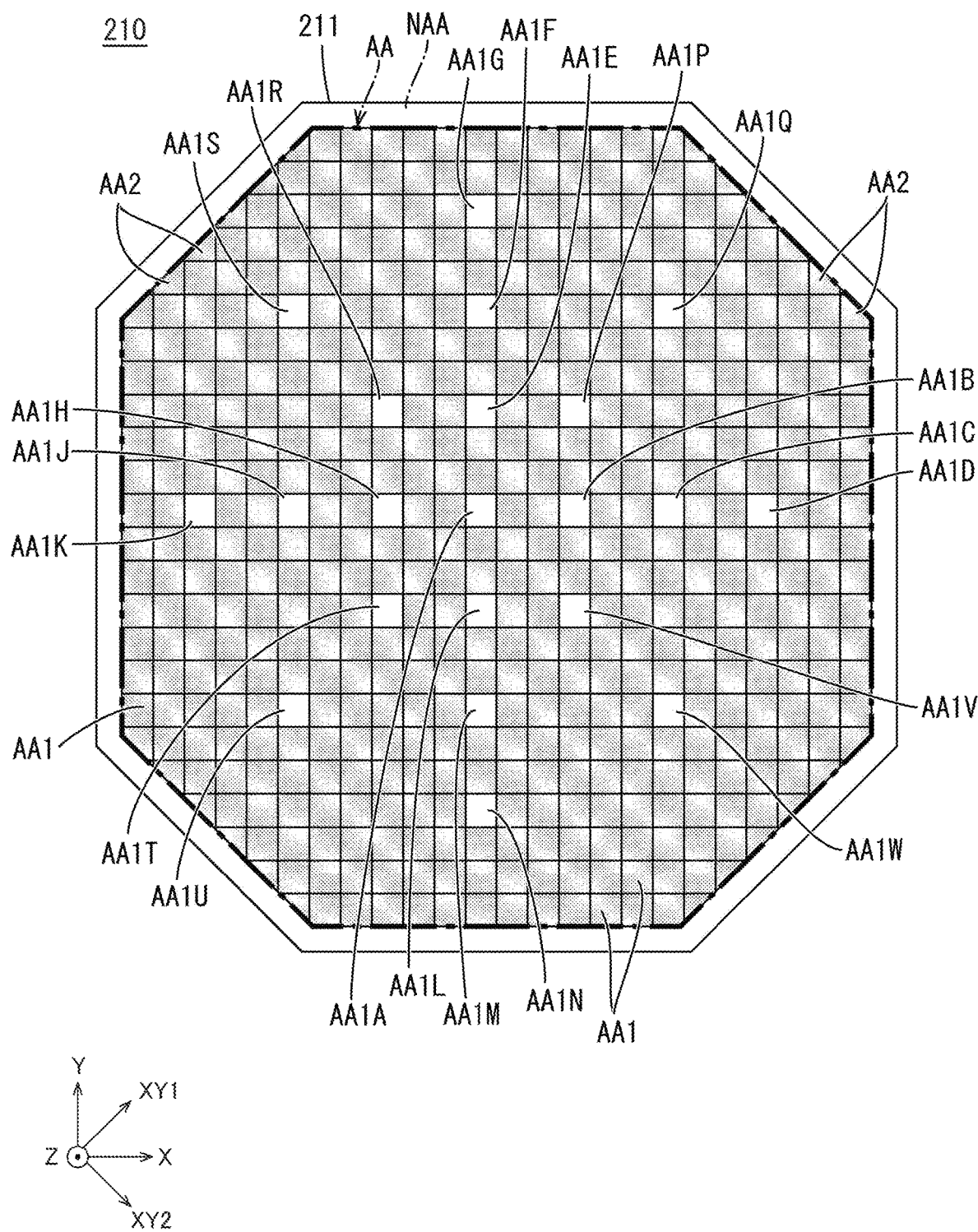
FIG. 22 is a plan view of the liquid crystal panel including specified display sections through which light exits.

The method of defining the specified display sections AA1B to AA1W will be specifically described with reference to FIGS. 22 and 23.

The specified display section AA1B is defined as follows. The pixel matrix unit at the position that is off by the three columns of the pixels PX in the +X-axis direction (the right side in FIG. 22) from the pixel matrix unit disposed in the first default display section AAD1 that is the third one in the +X-axis direction from the reference display section AA1A is selected. The area in which the selected pixel matrix unit is disposed is defined as the specified display section AA1B.

The specified display section AA1C is defined as follows. The pixel matrix unit at the position that is off by the six columns of the pixels PX in the +X-axis direction from the pixel matrix unit disposed in the first default display section AAD1 that is the sixth one in the +X-axis direction from the reference display section AA1A is selected. The area in which the selected pixel matrix unit is disposed is defined as the specified display section AA1C.

The specified display section AA1D is defined as follows. The pixel matrix unit at the position that is off by the nine columns of the pixels PX in the +X-axis direction from the pixel matrix disposed in the first default display section AAD1 that is the ninth one in the +X-axis direction from the reference display section AA1A is selected. The area in which the selected pixel matrix unit is disposed is defined as the specified display section AA1D.

The specified display section AA1E is defined as follows. The pixel matrix unit at the position that is off by the three rows of the pixels PX in the +Y-axis direction (the upper side in FIG. 22) from the pixel matrix unit disposed in the first default display section AAD1 that is the third one in the +Y-axis direction from the reference display section AA1A is selected. The area in which the selected pixel matrix unit is disposed is defined as the specified display section AA1E.

The specified display section AA1F is defined as follows. The pixel matrix unit at the position that is off by the six rows of the pixels PX in the +Y-axis direction from the pixel matrix unit disposed in the first default display section AAD1 that is the sixth one in the +Y-axis direction from the reference display section AA1A is selected. The area in which the selected pixel matrix unit is disposed is defined as the specified display section AA1F.

The specified display section AA1G is defined as follows. The pixel matrix unit at the position that is off by the nine rows of the pixels PX in the +Y-axis direction from the pixel matrix unit disposed in the first default display section AAD1 that is the sixth one in the +Y-axis direction from the reference display section AA1A is selected. The area in which the selected pixel matrix unit is disposed is defined as the specified display section AA1G.

The specified display section AA1H is defined as follows. The pixel matrix unit at the position that is off by the three columns of the pixels PX in the −X-axis direction (the left side in FIG. 22) from the pixel matrix unit disposed in the first default display section AAD1 that is the third one in the −X-axis direction from the reference display section AA1A is selected. The area in which the selected pixel matrix unit is disposed is defined as the specified display section AA1H.

The specified display section AA1J is defined as follows. The pixel matrix unit at the position that is off by the six columns of the pixels PX in the −X-axis direction from the pixel matrix unit disposed in the first default display section AAD1 that is the sixth one in the −X-axis direction from the reference display section AA1A is selected. The area in which the selected pixel matrix unit is disposed is defined as the specified display section AA1J.

The specified display section AA1K is defined as follows. The pixel matrix unit at the position that is off by the nine columns of the pixels PX in the −X-axis direction from the pixel matrix unit disposed in the first default display section AAD1 that is the ninth one in the −X-axis direction from the reference display section AA1A is selected. The area in which the selected pixel matrix unit is disposed is defined as the specified display section AA1K.

The specified display section AA1L is defined as follows. The pixel matrix unit at the position that is off by the three rows of the pixels PX in the −Y-axis direction (the lower side in FIG. 22) from the pixel matrix unit disposed in the first default display section AAD1 that is the third one in the −Y-axis direction from the reference display section AA1A is selected. The area in which the selected pixel matrix unit is disposed is defined as the specified display section AA1L.

The specified display section AA1M is defined as follows. The pixel matrix unit at the position that is off by the six rows of the pixels PX in the −Y-axis direction from the pixel matrix unit disposed in the first default display section AAD1 that is the sixth one in the −Y-axis direction from the reference display section AA1A is selected. The area in which the selected pixel matrix unit is disposed is defined as the specified display section AA1M.

The specified display section AA1N is defined as follows. The pixel matrix unit at the position that is off by the nine rows of the pixels PX in the −Y-axis direction from the pixel matrix unit disposed in the first default display section AAD1 that is the ninth one in the −Y-axis direction from the reference display section AA1A is selected. The area in which the selected pixel matrix unit is disposed is defined as the specified display section AA1N.

The specified display section AA1P is defined as follows. The pixel matrix unit at the position that is off by the three columns of the pixels PX in the +X-axis direction and the three rows of the pixels PX in the +Y-axis direction from the pixel matrix unit disposed in the first default display section AAD1 that is the third one in the +X-axis direction and the third one in the +Y-axis direction from the reference display section AA1A (the third upper right one from the reference display section AA1A with respect to the first direction XY1 in FIG. 22) is selected. The area in which the selected pixel matrix unit is disposed is defined as the specified display section AA1P.

The specified display section AA1Q is defined as follows. The pixel matrix unit at the position that is off by the six columns of the pixels PX in the +X-axis direction and the six rows of the pixels PX in the +Y-axis direction from the pixel matrix unit disposed in the first default display section AAD1 that is the sixth one in the +X-axis direction and the sixth one in the +Y-axis direction from the reference display section AA1A (the sixth upper right one from the reference display section AA1A with respect to the first direction XY1 in FIG. 22) is selected. The area in which the selected pixel matrix unit is disposed is defined as the specified display section AA1Q.

The specified display section AA1R is defined as follows. The pixel matrix unit at the position that is off by the three columns of the pixels PX in the −X-axis direction and the three rows of the pixels PX in the +Y-axis direction from the pixel matrix unit disposed in the first default display section AAD1 that is the third one in the −X-axis direction and the third one in the +Y-axis direction from the reference display section AA1A (the third upper left one from the reference display section AA1A with respect to the second direction XY2 in FIG. 22) is selected. The area in which the selected pixel matrix unit is disposed is defined as the specified display section AA1R.

The specified display section AA1S is defined as follows. The pixel matrix unit at the position that is off by the six columns of the pixels PX in the −X-axis direction and the six rows of the pixels PX in the +Y-axis direction from the pixel matrix unit disposed in the first default display section AAD1 that is the sixth one in the −X-axis direction and the sixth one in the +Y-axis direction from the reference display section AA1A (the sixth upper left one from the reference display section AA1A with respect to the second direction XY2 in FIG. 22) is selected. The area in which the selected pixel matrix unit is disposed is defined as the specified display section AA1S.

The specified display section AA1T is defined as follows. The pixel matrix unit at the position that is off by the three columns of the pixels PX in the −X-axis direction and the three rows of the pixels PX in the −Y-axis direction from the pixel matrix unit disposed in the first default display section AAD1 that is the third one in the −X-axis direction and the third one in the −Y-axis direction from the reference display section AA1A (the third lower left one from the reference display section AA1A with respect to the first direction XY1 in FIG. 22) is selected. The area in which the selected pixel matrix unit is disposed is defined as the specified display section AA1T.

The specified display section AA1U is defined as follows. The pixel matrix unit at the position that is off by the six columns of the pixels PX in the −X-axis direction and the six rows of the pixels PX in the −Y-axis direction from the pixel matrix unit disposed in the first default display section AAD1 that is the sixth one in the −X-axis direction and the sixth one in the −Y-axis direction from the reference display section AA1A (the sixth lower left one from the reference display section AA1A with respect to the first direction XY1 in FIG. 22) is selected. The area in which the selected pixel matrix unit is disposed is defined as the specified display section AA1U.

The specified display section AA1V is defined as follows. The pixel matrix unit at the position that is off by the three columns of the pixels PX in the +X-axis direction and the three rows of the pixels PX in the −Y-axis direction from the pixel matrix unit disposed in the first default display section AAD1 that is the third one in the +X-axis direction and the third one in the −Y-axis direction from the reference display section AA1A (the third lower right one from the reference display section AA1A with respect to the second direction XY2 in FIG. 22) is selected. The area in which the selected pixel matrix unit is disposed is defined as the specified display section AA1V.

The specified display section AA1W is defined as follows. The pixel matrix unit at the position that is off by the six columns of the pixels PX in the +X-axis direction and the six rows of the pixels PX in the −Y-axis direction from the pixel matrix unit disposed in the first default display section AAD1 that is the sixth one in the +X-axis direction and the third one in the −Y-axis direction from the reference display section AA1A (the sixth lower right one from the reference display section AA1A with respect to the second direction XY2 in FIG. 22) is selected. The area in which the selected pixel matrix unit is disposed is defined as the specified display section AA1W.

In this embodiment, with respect to the reference light exit section EA1A, each of the specified light exit sections EA1B to EA1W is specified in every three light exit sections; however, each of the specified light exit sections EA1B to EA1W may be specified in every two light exit sections, every four light exit sections, or more. The first default display sections AAD1, which are used as a reference for defining the specified display sections AA1B to AA1W, are specified similar to the specified light exit sections EA1B to EA1W. With respect to the defining of the pixel matrix unit included in each of the specified display sections AA1B to AA1W, the number of columns and rows of the pixels with which the pixel matrix unit to be defined is off from the pixel matrix unit disposed in the corresponding first default display section AAD1 is not limited to the above-described number.

The deviation detecting process may be performed without using the specified display sections ARID, AA1G, AA1K, AA1N, AA1Q, AA1S, AA1U, and AA1W. The deviation detecting process may be performed without using the specified display sections AA1C, AA1F, AA1J, AA1M, AA1P, AA1R, AA1T, and AA1V.

The light exit sections EA1 that are disposed on an outer side with respect to the specified light exit sections EA1B to EA1W may be defined as the specified light exit sections that are used for the deviation detecting process. In such a method, the specified light exit sections EA1D, EA1G, EA1K, EA1N, EA1Q, EA1S, EA1U, and EA1W may not be used. The specified light exit sections EA1C, EA1F, EA1J, EA1M, EA1P, EA1R, EA1T, and EA1V may not be used.

The backlight control circuit 222 controls the LED driver 23 to turn on the LEDs 217 corresponding to the reference light exit section EA1A and the specified light exit sections EA1B to EA1W. Thus, light exits the reference light exit section EA1A and the specified light exit sections EA1B to EA1W. Then, the gate driver 220 and the source driver 221 drive the pixels in the reference display section AMA and the specified display sections AA1B to AA1W and allow the light to pass through the reference display section AA1A and the specified display sections AA1B to AA1W.

The amounts of light rays that pass through the reference display section AA1A and the specified display sections AA1B to AA1W are measured by the external device. One of the reference display section AA1A and the specified display sections AA1B to AA1W having the greatest amount of light rays passing therethrough is specified and the determination result is sent to the control circuit 218.

The pixels included in the specified display section having the greatest amount of light rays passing therethrough include non-corresponding pixels that are not included in the corresponding first default display section AAD1. The correction circuit 224 determines the deviation amount based on the number of rows and the number of columns of the non-corresponding pixels. The correction circuit 224 determines the deviation direction based on the direction in which the non-corresponding pixels are disposed with respect to the first default display section AAD1. The correction circuit 224 creates the deviation data representing the deviation direction and the deviation amount and stores the deviation data in the memory 226.

Figure 24:
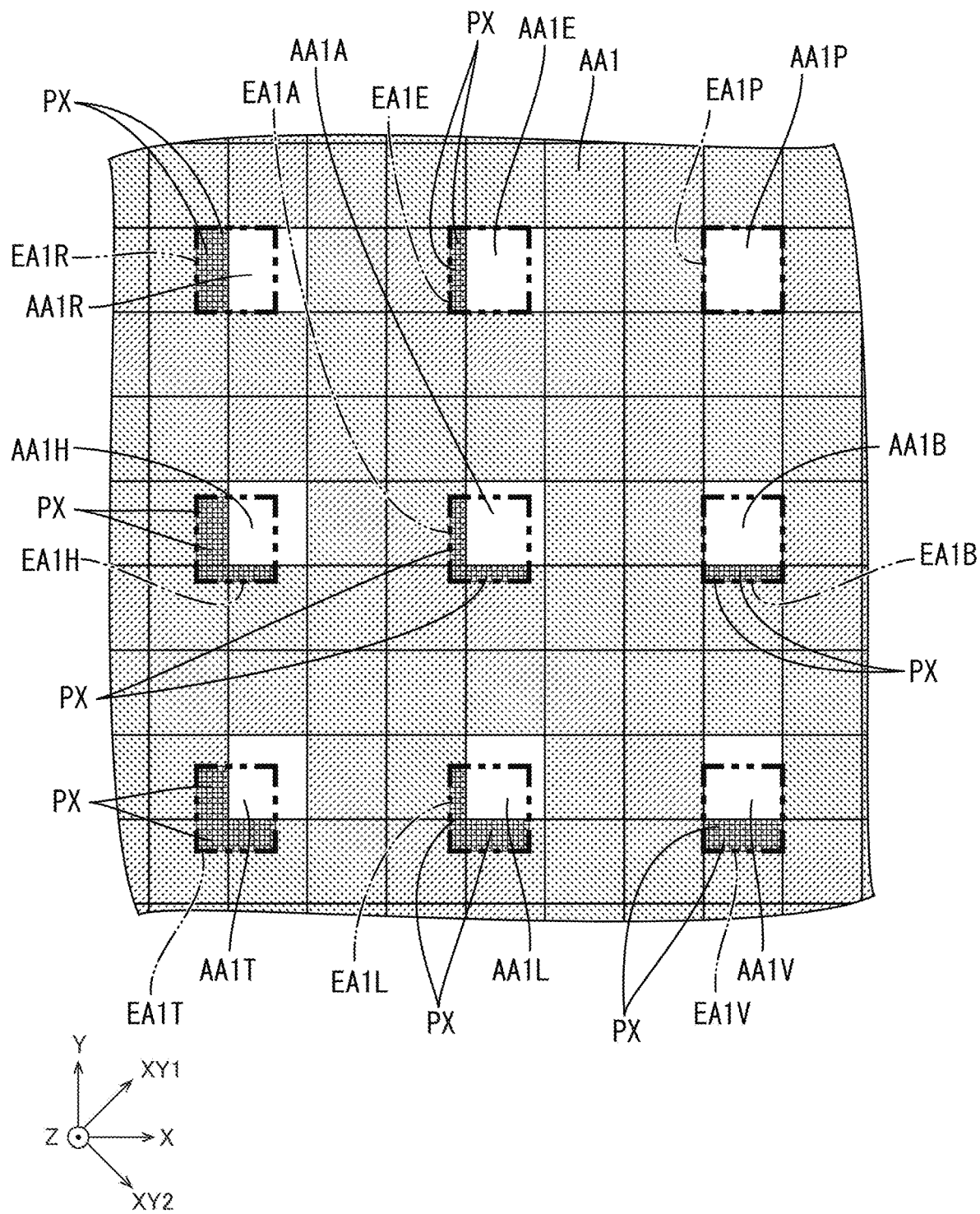
FIG. 24 is a magnified plan view illustrating the position relation between the specified display sections and the specified light exit sections in a middle portion of the display area.

For example, the position error illustrated in FIG. 24 is caused between the light exit sections EA1 and the first default display sections AAD1, respectively. Namely, the specified light exit section EA1P matches the specified display section AA1P. In such a configuration, the amount of light rays close to a predetermined value passes through the specified display section AA1P.

The specified light exit sections EA1B to EA1N and EA1Q to EA1W that are other than the specified light exit section EA1P do not match the specified display sections AA1B to AA1N and AA1Q to AA1W, respectively. Therefore, some of the light rays that exit through the respective specified light exit sections EA1B to EA1N and EA1Q to EA1W do not pass through the corresponding specified display sections AA1B to AA1N and AA1Q to AA1W, respectively, and this causes shortage of the amount of light rays passing therethrough. The shortage of the amount of light rays passing through the reference display section ARIA is similarly caused.

Therefore, the amount of light rays passing through the specified display section AA1P is greatest and it is determined that the specified display section AA1P is a section having the greatest amount of light rays passing therethrough.

Figure 23:
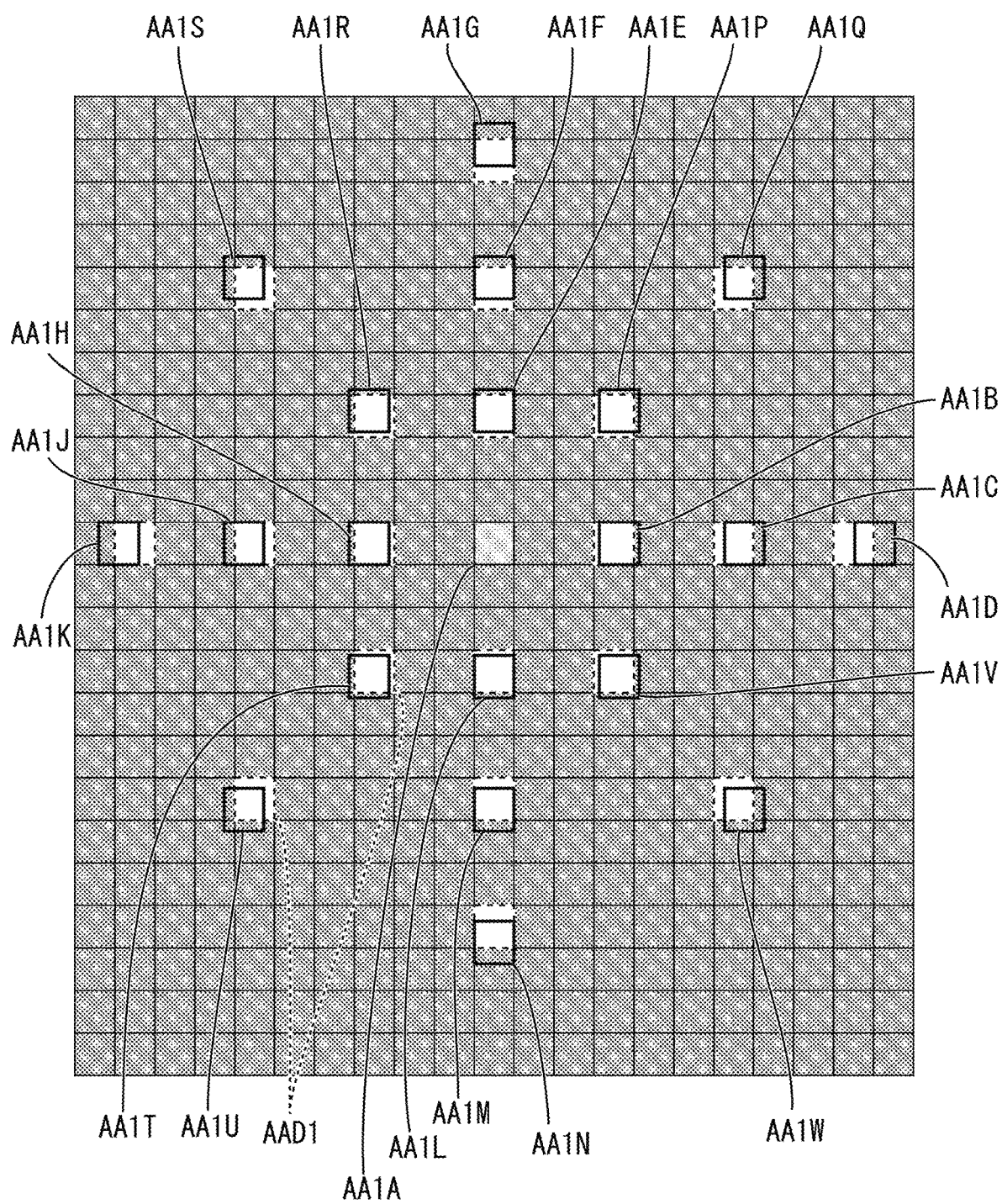
FIG. 23 is a plan view illustrating a position relation between the display sections and the specified display sections.

With reference to FIG. 23, the specified display section AA1P includes pixel matrix unit that is off by the three columns of pixels PX in the +X-axis direction and the three rows of pixels PX in the +Y-axis direction from the corresponding first default display section AAD1. Accordingly, the deviation data representing the deviation amount corresponding to the three columns of pixels and the three rows of pixels and the +deviation direction along the first direction XY1 is created.

Through the brightness uniformizing process and the deviation detecting process described above, the precise deviation data representing the deviation amount and the deviation direction can be created. The correction circuit 224 can perform a precise correcting process based on the precise deviation data. The correction circuit 224 performs the correcting process based on the deviation data stored in the memory 226 similar to the correcting process performed by the correction circuit 24 of the first embodiment and illustrated in FIG. 9.

According to such a configuration, the correcting process can be performed based on more precise deviation data. Therefore, even if the liquid crystal panel 211 is mounted on the backlight 216 with a physical position error, that is, even if the display area AA does not match the light exit area EA, the light amount control (the local dimming control) of providing light to the first display sections AA1 and the second display sections AA2 can be performed as designed. Compared to the prior technology, the liquid crystal display device 210 having improved contrast performance and improved display quality can be provided.

Next, a method of producing the liquid crystal display device 210 will be described. The method of producing the liquid crystal display device 210 includes the mounting process, the brightness uniformizing process, the deviation detecting process, and the correcting process. The correcting process, which is similar to that of the first embodiment, will not be described and the mounting process, the brightness uniformizing process, and the deviation detecting process will be described.

In the mounting process, the liquid crystal panel 211 is mounted on the backlight 216 and the liquid crystal display device 210 is obtained. In the obtained liquid crystal display device 210, a position error may be caused between the first default display sections AAD1 and the corresponding light exit sections EA1 and between the second default display sections AAD2 and the corresponding light exit sections EA1 due to the dimension errors of the components and the assembly errors. After the brightness unevenness in the display area AA of the liquid crystal panel 211 is reduced to achieve the brightness uniformity, the position error is detected and the correcting process is performed.

The brightness uniformizing process will be described. First, all the LEDs 217 are turned on to display with white in all of the first display sections AA1 and the second display sections AA2 of the liquid crystal panel 211. Namely, light passes through all the first display sections AA1 and all the second display sections AA2. Next, brightness of each of the first display sections AA1 and the second display sections AA2 is measured. The first display sections AA1 and the second display sections AA2 having brightness higher than the predefined value are specified and first brightness correction data including position data of the specified display section is created. The first display sections AA1 and the second display sections AA2 having brightness lower than the predefined value are specified and second brightness correction data including position data of the specified display section is created. The amounts of light rays emitted by the corresponding LEDs 217 are reduced based on the first brightness correction data. The amounts of light rays emitted by the corresponding LEDs 217 are increased based on the second brightness correction data. This uniformizes the brightness of the display area AA of the liquid crystal panel 211.

After the completion of the brightness uniformizing process, the deviation detecting process is performed. In the deviation detecting process, the light exit section EA1 that is disposed at a middle of the light exit area EA is defined as the reference light exit section EA1A. With respect to the reference light exit section EA1A, the light exit section EA1 in every three light exit sections EA1 in the X-axis direction, the Y-axis direction, the first direction XY1, and the second direction XY2 is selected and the selected light exit sections EA1 are defined as the specified light exit sections EA1B, EA1C, EA1D, EA1E, EA1F, EA1G, EA1H, EA1J, EA1K, EA1L, EA1M, EA1N, EA1P, EA1Q, EA1R, EA1S, EA1T, EA1U, EA1V, and EA1W.

The specified light exit section data including the position data of the reference light exit section EA1A and the specified light exit sections EA1B to EA1W is created and stored in the memory 226.

The specified display sections AA1A, AA1B, AA1C, AA1D, AA1E, AA1F, AA1G, AA1H, AA1J, AA1K, AA1L, AA1M, AA1N, AA1P, AA1Q, AA1R, AA1S, AA1T, AA1U, AA1V, and AA1W that correspond to the specified light exit sections EA1A to EA1Y and are used in the deviation detecting process are defined. The specified display section AA1A is disposed in a middle of the display area AA and corresponds to the reference light exit section EA1A and is defined as the reference display section AA1A.

The specific method of defining the specified display sections AA1B to AA1W is same as the one described above. The specified display section data including the reference display section AA1A and the specified display sections AA1B to AA1W is created and stored in the memory 226.

The LEDs 217 corresponding to the reference light exit section EA1A and the specified display sections AA1B to AA1W are turned on based on the specified light exit section data and the light exits the reference light exit section EA1A and the specified display sections AA1B to AA1W.

The pixels disposed in the reference display section AA1A and the specified display sections AA1B to AA1W are driven based on the specified display section data and the light passes through the reference display section AA1A and the specified display sections AA1B to AA1W.

The amounts of light rays that pass through the reference display section AA1A and the specified display sections AA1B to AA1W are measured. One of the reference display section AA1A and the specified display sections AA1B to AA1W having the greatest amount of light rays passing therethrough is determined and the determination result is stored in the memory 226.

Based on the determination result, the deviation amount is determined based on the number of rows and the number of columns of the pixels that are not included in the corresponding first default display section AAD1 out of the pixels included in the display section having the greatest amount of light rays passing therethrough. The display section having the greatest amount of light rays passing therethrough is one of the reference display section AA1A and the specified display sections AA1B to AA1W. The deviation direction is determined based on the direction in which the pixels that are not included in the corresponding first default display section AAD1 are disposed with respect to the first default display section AAD1. The deviation data representing the deviation direction and the deviation amounts is created and stored in the memory 226.

Based on the deviation data stored in the memory 226, the correcting process similar to the correcting process of the first embodiment will be performed.

With the above method, the deviation detecting process is performed after the brightness uniformizing process and therefore, the correcting process can be performed based on more precise deviation data. Even if the liquid crystal panel 211 is mounted on the backlight 216 with a physical position error, that is, even if the display area AA does not match the light exit area EA, the light amount control (the local dimming control) of providing light to the first display sections AA1 and the second display sections AA2 can be performed as designed. Compared to the prior technology, the liquid crystal display device 210 having improved contrast performance and improved display quality can be provided.

The method of producing of producing the liquid crystal display device according to this embodiment can be applied to the first embodiment.

Other Embodiments

The technology described herein is not limited to the embodiments described in this specification and illustrated in the drawings. For example, the following embodiments may be included in the technical scope of the present invention.

(1) In the deviation detecting process, one of the display sections AA1B to AA1W having the greatest amount of light rays passing therethrough may be specified by performing the process of defining the specified display sections several times with different conditions. For example, in the first process of defining the specified display section AA1B, the pixel matrix unit that is off by three columns of pixels PX from the pixel matrix unit included in the default pixel matrix data may be selected and the area in which the selected pixel matrix unit is disposed may be defined as the specified display section AA1B. Then, the display section having the greatest amount of light rays passing therethrough may be specified. In the second process of defining the specified display section AA1B, the pixel matrix unit that is off by two columns of pixels PX from the pixel matrix unit included in the default pixel matrix data may be selected and the area in which the selected pixel matrix unit is disposed may be defined as the specified display section AA1B. Then, the display section having the greatest amount of light rays passing therethrough may be specified. The greatest amount of light rays obtained in the first process and the greatest amount of light rays obtained in the second process may be compared. Based on a greater one of the greatest amounts of light rays, the deviation direction and the deviation amount may be determined and the deviation data may be created.

(2) In the configuration of (1), a third process of defining the specified display sections may be further performed. For example, in the third process, the pixel matrix unit that is off by one column of pixels PX from the pixel matrix unit included in the default pixel matrix data may be selected and the area in which the selected pixel matrix unit is disposed may be defined as the specified display section AA1B. Then, the display section having the greatest amount of light rays passing therethrough may be specified. The greatest amount of the third process and a greater one of the greatest amount of light rays obtained in the first process and the greatest amount of light rays obtained in the second process and may be compared. Based on the greatest one of the greatest amounts of light rays, the deviation direction and the deviation amount may be determined and the deviation data may be created. The multiple processes may be performed similarly for the specified display sections AA1C to AA1W.

(3) A planar shape of the first display sections AA1 and the light exit sections EA1 may be laterally-long rectangular shape or a square.

(4) The number of rows and columns of the first display sections AA1 may differ from the number of rows and columns of the light exit sections EA1.

(5) The number of LEDs linked to each of the light exit sections EA1 may be one, three or more.

(6) The control circuit 18, 118 may not include the correction circuit 24, 124. In such a configuration, a correction circuit may be provided separately from the control circuit 18, 118. For example, a host system that is a supply source of the image signals may include the correction circuit.

(7) The control circuit 18, 118 may not include the calculation circuit 25, 125. For example, the backlight control circuit 22, 122, 222 may have the function of the calculation circuit 25, 125. The calculation circuit 25, 125 may be provided separately from the control circuit 18, 118.

(8) The gate driver 20, 120, 220, the source driver 21, 121, 221, and the LED driver 23 may be provided separately from the control circuit 18, 118.

(9) Organic EL elements may be used as the light source other than the LEDs 17, 117, 217.

(10) The display area AA and the light exit area EA may have outline shapes such as square, trapezoidal, circular, or oval shapes.

(11) The liquid crystal panel 11, 111, 211 and the backlight 16, 216 may have outline shapes such as square, trapezoidal, circular, or oval shapes.

(12) The liquid crystal display device 10, 110, 210 may be used for devices other than the head mount display.

What is claimed is:

1. A display device comprising:
a lighting device including light sources and a light exit area from which light emitted by the light sources exits, the light exit area including light exit sections that are defined corresponding to the light sources;
a display panel mounted on the lighting device and including a display area and a non-display area, the display area disposed opposite the light exit area and displaying an image and the non-display area disposed around the display area, the display panel further including pixels arranged in a matrix in the display area, the display area including display sections that are defined to be respectively disposed opposite the light exit sections;

a memory storing default pixel matrix data including a plurality of position data of default pixel matrix units including the pixels that are linked to the display sections with respect to design, the memory further storing non-opposite pixel data and deviation data when a position error is caused between the light exit area and the display area, the non-opposite pixel data including position data of one or more of the pixels that are not disposed opposite the light exit area when the position error is caused, the deviation data including data representing a deviation direction and a deviation amount that are related to a deviation between positions of the default pixel matrix units that are included in the default pixel matrix data and positions of opposite pixel matrix units that are disposed opposite corresponding light exit sections when the position error is caused; and a correction circuit connected to the memory and configured to determine whether the memory stores the non-opposite pixel data, and if determining that the memory stores the non-opposite pixel data, respectively link the opposite pixel matrix units of the pixels that are off from the default pixel matrix units included in the default pixel matrix data by the deviation amount in the deviation direction represented by the deviation data to corresponding display sections, and create new pixel matrix data related to the opposite pixel matrix units in the corresponding display sections and store the new pixel matrix data in the memory.

2. The display device according to claim 1, wherein the deviation data represents a number of rows and columns of the pixels and a direction with which the default pixel matrix units included in the default pixel matrix data are off from the opposite pixel matrix units that are disposed opposite the corresponding light exit sections.

3. The display device according to claim 1, further comprising a display driver connected to the display panel and configured to control the display sections that are linked to the opposite pixel matrix units included in the new pixel matrix data to display the image.

4. The display device according to claim 3, wherein the display panel further includes an auxiliary display area between the display area and the non-display area, the auxiliary display area includes pixels that are arranged in rows and columns, and the correction circuit is further configured to link the opposite pixel matrix units including the pixels that are disposed in the display area and the pixels that are disposed in the auxiliary display area to the corresponding display sections and create the new pixel matrix data, the opposite pixel matrix units including the pixels that are off from the default pixel matrix data by the deviation amount in the deviation direction represented by the deviation data.

5. The display device according to claim 4, wherein the correction circuit is further configured to create black display pixel data including position data of the pixels that are not linked to the display sections and to store the black display pixel data in the memory, and the display driver is further configured to control the pixels included in the black display pixel data to display a black image.

6. The display device according to claim 3, further comprising an image signal process circuit connected to the correction circuit and configured to receive image signals related to the image to be displayed on the display sections and process the image signals and input processed image signals to the display driver, wherein the display driver is further configured to receive the processed image signals and control the display sections to display the image based on the processed image signals.

7. The display device according to claim 6, further comprising a calculation circuit connected to the correction circuit and configured to receive the new pixel matrix data from the correction circuit and to calculate values respectively representing luminance necessary for displaying the image for the display sections, based on the new pixel matrix data.

8. The display device according to claim 7, wherein the calculation circuit is further configured to receive the processed image signals from the correction circuit and to calculate the values respectively representing luminance necessary for displaying the image for the display sections, based on the new pixel matrix data and the processed image signals.

9. A method of producing a display device comprising:

for a lighting device including light sources and a light exit area from which light from the light sources exits, defining a light exit area into light exit sections respectively corresponding to the light sources;

for a display panel including a display area displaying an image, pixels disposed in rows and columns, and a non-display area disposed around the display area, defining the display area into display sections that are respectively disposed opposite the light exit sections;

mounting the display panel on the lighting device;

with the display sections being defined as default display sections, determining whether a position error is respectively caused between default pixel matrix units including the pixels disposed in the default display sections and corresponding light exit sections to be disposed opposite the default pixel matrix units;

if determining the position error is caused, determining a deviation direction and a deviation amount of the default pixel matrix units with respect to the corresponding light exit sections; and defining sections in which pixel matrix units of the pixels that are off from the default pixel matrix units by the deviation amount in the deviation direction as new display sections.

10. The method according to claim 9, further comprising:

prior to the determining of the position error, turning on all the light sources to allow the light from the light sources to pass through corresponding display sections;

measuring brightness of each of the display sections;

comparing the brightness of each of the display sections to a predefined value;

specifying high brightness display sections having the brightness higher than the predefined value and low brightness display sections having the brightness lower than the predefined value, based on results of the comparing; and among the light exit sections, decreasing amounts of light that is emitted by the light sources corresponding to the light exit sections that are disposed opposite to the high brightness display sections and increasing amounts of light that is emitted by the light sources corresponding to the light exit sections that are disposed opposite the low brightness display sections so as to uniformize brightness of the display area.

11. The method according to claim 10, further comprising:
- defining one of the light exit sections that is disposed in a middle of the light exit area as a reference light exit section;
- among the light exit sections, specifying first four light exit sections that are disposed on upper, lower, right, and left sides with respect to the reference light exit section and away from the reference light exit section by a same distance and defining the first four light exit sections as first specified light exit sections;
- selecting first default display sections out of the default display sections, the first default display sections being respectively disposed opposite the first specified light exit sections;
- specifying pixel matrix units that are off from pixel matrix units disposed in the first default display sections by a predefined number of pixels and defining first specified display sections that include specified pixel matrix units;
- turning on the light sources corresponding to the first specified light exit sections;
- driving the pixels disposed in the first specified display sections;
- measuring amounts of light that passes through the first specified display sections;
- specifying one specified display section out of the first specified display sections, the one specified display section having a greatest amount of light passing therethrough; and
- determining the deviation direction and the deviation amount based on a deviation direction and a deviation amount with which the one specified display section is off from the default display section corresponding to the one specified display section.

12. The method according to claim 11, further comprising:
- among the light exit sections, specifying second four light exit sections that are disposed on upper, lower, right, and left sides and an outer side with respect to the first four light exit sections and away from the reference light exit section by a same distance and defining the second four light exit sections as second specified light exit sections;
- selecting second default display sections out of the default display sections, the second default display sections being respectively disposed opposite the second specified light exit sections;
- specifying pixel matrix units that are off from pixel matrix units disposed in the second default display sections by a predefined number of pixels and defining second specified display sections that include specified pixel matrix units;
- turning on the light sources corresponding to the second specified light exit sections;
- driving the pixels disposed in the second specified display sections;
- measuring amounts of light that passes through the second specified display sections; and
- specifying one specified display section out of the first specified display sections and the second specified display sections, the one specified display section having the greatest amount of light passing therethrough.

13. The method according to claim 12, further comprising:
- among the light exit sections, specifying third four light exit sections that are disposed on upper right, upper left, right lower, and left lower sides with respect to the reference light exit section and away from the reference light exit section by a same distance and defining the third four light exit sections as third specified light exit sections;
- selecting third default display sections out of the default display sections, the third default display sections being respectively disposed opposite the third specified light exit sections;
- specifying pixel matrix units that are off from pixel matrix units disposed in the third default display sections by a predefined number of pixels and defining third specified display sections that include specified pixel matrix units;
- turning on the light sources corresponding to the third specified light exit sections;
- driving the pixels disposed in the third specified display sections;
- measuring amounts of light that passes through the third specified display sections; and
- specifying one specified display section out of the first specified display sections, the second specified display sections, and the third specified display sections, the one specified display section having the greatest amount of light passing therethrough.

* * * * *